US008175058B2

(12) United States Patent
Oba et al.

(10) Patent No.: US 8,175,058 B2
(45) Date of Patent: *May 8, 2012

(54) MOBILITY ARCHITECTURE USING PRE-AUTHENTICATION, PRE-CONFIGURATION AND/OR VIRTUAL SOFT-HANDOFF

(75) Inventors: Yoshihiro Oba, Englewood Cliffs, NJ (US); Shinichi Baba, Kawasaki (JP)

(73) Assignees: Telcordia Technologies, Inc., Piscataway, NJ (US); Toshiba America Research, Inc., Piscataway, NJ (US)

( * ) Notice: Subject to any disclaimer, the term of this patent is extended or adjusted under 35 U.S.C. 154(b) by 0 days.

This patent is subject to a terminal disclaimer.

(21) Appl. No.: 12/426,839

(22) Filed: Apr. 20, 2009

(65) Prior Publication Data
US 2009/0271614 A1 Oct. 29, 2009

Related U.S. Application Data

(62) Division of application No. 11/405,039, filed on Apr. 17, 2006, now Pat. No. 7,548,526, which is a division of application No. 10/761,243, filed on Jan. 22, 2004, now Pat. No. 7,046,647.

(51) Int. Cl.
*H04W 4/00* (2009.01)
(52) U.S. Cl. ........................................................ 370/331
(58) Field of Classification Search .................. 370/331, 370/328, 338, 351–356, 401, 402; 455/436, 455/433, 444
See application file for complete search history.

(56) References Cited

U.S. PATENT DOCUMENTS

| 6,094,426 | A | 7/2000 | Honkasalo et al. |
| 6,832,087 | B2 | 12/2004 | Gwon et al. |
| 6,965,584 | B2 * | 11/2005 | Agrawal et al. ............... 370/331 |
| 7,046,647 | B2 * | 5/2006 | Oba et al. ..................... 370/331 |
| 7,548,526 | B2 | 6/2009 | Oba |
| 2002/0098840 | A1 | 7/2002 | Hanson et al. |
| 2002/0118656 | A1 | 8/2002 | Agrawal et al. |
| 2002/0167921 | A1 | 11/2002 | Vakil et al. |

(Continued)

FOREIGN PATENT DOCUMENTS

JP 2003-209873 A 7/2003

OTHER PUBLICATIONS

B. Aboba, "IEEE 802.1X Pre-Authentication", IEEE 802.11 Wireless LANs, Jun. 2002, p. 1-50, Microsoft, USA.

(Continued)

*Primary Examiner* — Chi H Pham
*Assistant Examiner* — Alexander Boakye
(74) *Attorney, Agent, or Firm* — Westerman, Hattori, Daniels, & Adrian, LLP

(57) ABSTRACT

In some illustrative embodiments, a novel system and method is provided that can, for example, extend concepts of pre-authentication (such as, e.g., IEEE 802.11i pre-authentication) so as to operate across networks or subnetworks (such as, e.g., IP subnets). In preferred embodiments, a novel architecture includes one or both of two new mechanisms that substantially improve, e.g., higher-layer handoff performance. A first mechanism is referred to as "pre-configuration," which allows a mobile to pre-configure higher-layer information effective in candidate IP subnets to handoff. A second mechanism is referred to as "virtual soft-handoff," which allows a mobile to send or receive packets through the candidate IP subnets even before it is actually perform a handoff to any of the candidate IP subnets.

16 Claims, 15 Drawing Sheets

U.S. PATENT DOCUMENTS

| | | |
|---|---|---|
| 2003/0009576 A1 | 1/2003 | Apostolopoulos et al. |
| 2003/0125027 A1 | 7/2003 | Gwon et al. |
| 2003/0142647 A1 | 7/2003 | Agrawal |
| 2003/0193910 A1 | 10/2003 | Shoaib et al. |
| 2004/0073786 A1 | 4/2004 | O'Neill et al. |
| 2004/0085931 A1 | 5/2004 | Rezaiifar |
| 2004/0120328 A1 | 6/2004 | Adrangi et al. |
| 2004/0208144 A1 | 10/2004 | Vinayakray-Jani |
| 2004/0208151 A1 | 10/2004 | Haverinen et al. |
| 2004/0240412 A1 | 12/2004 | Winget |
| 2005/0018637 A1 | 1/2005 | Karoubalis et al. |
| 2005/0076216 A1 | 4/2005 | Nyberg |
| 2005/0105491 A1 | 5/2005 | Chaskar et al. |
| 2005/0113109 A1 | 5/2005 | Adrangi et al. |
| 2005/0147068 A1 | 7/2005 | Rajkotia |
| 2005/0157673 A1 | 7/2005 | Verma et al. |

OTHER PUBLICATIONS

B. Aboba, "PPP EAP TLS Authentication Protocol", Network Working Group, Oct. 1999, p. 1-23, Microsoft, USA.
R. Droms, "Authentication for DHCP Messages", Network Working Group, Jun. 2001, p. 1-16, USA.
P. Funk, "EAP Tunneled TLS Authentication Protocol (EAP-TTLS)", Internet-Draft, PPPEXT Working Group, Nov. 2002, p. 1-42, USA.
R. Glenn, "The Null Encryption Algorithm and Its Use With IPsec," Network Working Group, Nov. 1998, p. 1-6, USA.
"Port-Based Network Access Control", IEEE Standard for Local and Metropolitan Area Networks, Dec. 2004, p. 1-179, IEEE Std 802.1X-2004, USA.
"Wireless LAN Medium Access Control (MAC) and Physical Layer (PHY) Specifications," IEEE Standard for Local and Metropolitan Area Networks, 1999, Institute of Electrical and Electronics Engineers, Inc., p. 1-90, USA.
J. Loughney, "Context Transfer Protocol," Internet-Draft, Jun. 2003, p. 1-19, Seamoby WG, USA.
J. Loughney, "Context Transfer Protocol," Internet-Draft, Oct. 2003, p. 1-19, Seamoby WG, USA.
S. Kent, "IP Authentication Header," Network Working Group, Nov. 1998, p. 1-21, USA.
S. Kent, "IP Encapsulating Security Payload (ESP)," Network Working Group, Nov. 1998, p. 1-23, USA.
T. Kivinen, "DHCP over IKE", Internet-Draft, Apr. 2003, p. 1-14, IP Security Protocol Working Group, USA.
M. Liebsch, "Candidate Access Router Discovery", Internet-Draft, Mar. 2003, p. 1-28, IETF Seamoby Working Group, USA.
M. Liebsch, "Candidate Access Router Discovery", Internet-Draft, Sep. 2003, p. 1-28, IETF Seamoby Working Group, USA.
B. Patel, "Dynamic Host Configuration Protocol (DHCPv4) Configuration of IPsec Tunnel Mode", Jan. 2003, p. 1-17, USA.
J. Puthenkulam, Internet-Draft, Mar. 2003, p. 1-36, EAP Working Group, USA.
Y. Sheffer, "PIC, A Pre-IKE Credential Provisioning Protocol", Internet-Draft, Oct. 2002, p. 1-30, IPSRA Working Group, USA.
H. Tschofenig, "Bootstrapping RFC3118 Delayed Authentication using PANA", Internet-Draft, Jun. 2003, p. 1-19, IETF PANA Working Group, USA.
D. Forsberg, "Protocol for Carrying Authentication for Network Access (PANA)", Internet-Draft, Mar. 2003, p. 1-36, PANA Working Group, USA.
C. Kaufman, "Internet Key Exchange (IKEv2) Protocol", Internet-Draft, Apr. 2003, p. 1-94, IPSEC Working Group, USA.
B. Aboba, Extensible Authentication Protocol (EAP), Internet-Draft, Jun. 2004, p. 1-66, Network Working Group, USA.
D. Harkins, "The Internet Key Exchange (IKE)", Nov. 1998, p. 1-39, Network Working Group, USA.
M. Liebsch, "Candidate Access Router Discovery", Internet-Draft, Sep. 2003, p. 1-47, IETF Seamoby Working Group, USA.
A. Palekar, "Protected EAP Protocol (PEAP)", Internet-Draft, Mar. 2003, p. 1-52, PPPEXT Working Group, USA.
M. Kulkarni, "Mobile IPv4 Dynamic Home Agent Assignment", Internet-Draft, Jan. 2004, p. 1-22, USA.
R. Droms, "Dynamic Host Configuration Protocol," Network Working Group, Mar. 1997, p. 1-35, USA.
Mun, Y., "Layer 2 Handoff for Mobile IPv4 With 802.11 . . . , " Community.roxen.com, Sep. 2003, pp. 1-5.
Malki, K., Ei et al., "Local Mobility Management and Fast Handoffs in IPv6," Local Mobility & Fast Handoffs in IPv6, 2001, pp. 1-11.
Malki, K. Ei et al., Simultaneous Bindingis for Mobile IPv6 Fast Handoffs, in IPv6, Mobile IP Working Group, Jun. 2002, pp. 1-15.
Hsieh, Robert et al., "A Comparison of Mechanisms for Improving Mobile IP Handoff Latency for End-to-End TCP," 2003, pp. 1-13.
Daley, G. et al., "Movement Detection Optimization in Mobile IPv6," Mobile-IP Working Group, Feb. 2003, pp. 1-15.
Blunk, L. et al., "Extensible Authentication Protocol (EAP)," EAP Working Group, Sep. 2003, pp. 1-42.
Congdon, P., "IEEE 802.1X Overview—Ported Based Network Access Control," Hewlett Packard, Mar. 2000, pp. 1-11.
Kent, S et al. "RFC 2406—IP Encapsulating Security Payload," Network Working Group, Nov. 1998, pp. 1-17.
Chinese Office Action dated Feb. 23, 2011, issued in corresponding Chinese Patemt Application No. 201010184211.7.
Chinese Office Action dated dated Jan. 9, 2010, issued in Chinese Patent Application No. 200580002896.6.
Koodli, Fast Handovers for Mobile IPv6, Mobile IP Working Group, Internet Draft, Oct. 10, 2003.
Supplementary European Search Report dated Aug. 9, 2011, issued in corresponding European Patent Application No. 05711591.7.
Izumikawa, Haruki et al.; "Distributed Localized Mobility Management using Geographical Location Information"; The Institute of Electronics, Information and Communication Engineers,Technical Report of IEICE,(2002), Nov. 7, 2002, vol. 102, No. 440, pp. 43-50.
Japanese Office Action dated Aug. 9, 2011, issued in corresponding Japanese Patet Application No. 2009-204072.
McCann, P.; "Mobile IPv6 Fast Handovers for 802.11 Networks"; Lucent Technologies, draft-mccann-mobileip-80211fh-oo.txt, IETF Standard Rask Force, IEtf, CH, Sep. 1, 2011, XP015032255.
Koodli Rajeev. et al.; "Fast Handovers and Context Transfers in Mobile Networks"; Computer Communication Review, ACM, New York, NY, US, vol. 31, No. 5, Oct. 1, 2001, pp. 37-47, XP001115324.
Goswami, Subrata; DIAMETER Application for Mobile-IPv4 and 802.11 Authentication<draft-goswami-aaa-mipv4-wlan-auth-01.txt>; IETF Standard-Working-Drafts, Internet Engineering Task Force, IETF, CH , No. 1, Oct. 13, 2002, XP015001026.
Japanese Office Action dated Oct. 11, 2011, issued in corresponding Japanese Patent Application No. 2010-6847. (w/partial English translation).

* cited by examiner

MOBILITY ARCHITECTURE USING PRE-AUTHENTICATION, PRE-CONFIGURATION AND/OR VIRTUAL SOFT-HANDOFF

The present application is a divisional of and claims priority under 35 U.S.C. 120 to U.S. application Ser. No. 11/405,039, filed on Apr. 17, 2006, which is a divisional of and claims priority under 35 U.S.C. 120 to U.S. application Ser. No. 10/761,243, filed on Jan. 22, 2006, the entire disclosures of which applications are both incorporated herein by reference.

BACKGROUND

1. Field of the Invention

The present application relates to mobile network communications and, in some preferred embodiments, to changes in network attachment points during movement of a mobile node, station or device, commonly referred to in the mobile telephone field, by way of example, as a "hand-off." The preferred embodiments of the present invention provide, e.g., mobility architectures for changes in mobile device attachment points to networks, such as, e.g., to changes in wireless access point connections to the Internet or to another network.

2. Background Discussion

Networks and Internet Protocol

There are many types of computer networks, with the Internet having the most notoriety. The Internet is a worldwide network of computer networks. Today, the Internet is a public and self-sustaining network that is available to many millions of users. The Internet uses a set of communication protocols called TCP/IP (i.e., Transmission Control Protocol/Internet Protocol) to connect hosts. The Internet has a communications infrastructure known as the Internet backbone. Access to the Internet backbone is largely controlled by Internet Service Providers (ISPs) that resell access to corporations and individuals.

With respect to IP (Internet Protocol), this is a protocol by which data can be sent from one device (e.g., a phone, a PDA [Personal Digital Assistant], a computer, etc.) to another device on a network. There are a variety of versions of IP today, including, e.g., IPv4, IPv6, etc. Each host device on the network has at least one IP address that is its own unique identifier.

IP is a connectionless protocol. The connection between end points during a communication is not continuous. When a user sends or receives data or messages, the data or messages are divided into components known as packets. Every packet is treated as an independent unit of data.

In order to standardize the transmission between points over the Internet or the like networks, an OSI (Open Systems Interconnection) model was established. The OSI model separates the communications processes between two points in a network into seven stacked layers, with each layer adding its own set of functions. Each device handles a message so that there is a downward flow through each layer at a sending end point and an upward flow through the layers at a receiving end point. The programming and/or hardware that provides the seven layers of function is typically a combination of device operating systems, application software, TCP/IP and/or other transport and network protocols, and other software and hardware.

Typically, the top four layers are used when a message passes from or to a user and the bottom three layers are used when a message passes through a device (e.g., an IP host device). An IP host is any device on the network that is capable of transmitting and receiving IP packets, such as a server, a router or a workstation. Messages destined for some other host are not passed up to the upper layers but are forwarded to the other host. In the OSI and other similar models, IP is in Layer-3, the network layer. The layers of the OSI model are listed below.

Layer 7 (i.e., the application layer) is a layer at which, e.g., communication partners are identified, quality of service is identified, user authentication and privacy are considered, constraints on data syntax are identified, etc.

Layer 6 (i.e., the presentation layer) is a layer that, e.g., converts incoming and outgoing data from one presentation format to another, etc.

Layer 5 (i.e., the session layer) is a layer that, e.g., sets up, coordinates, and terminates conversations, exchanges and dialogs between the applications, etc.

Layer-4 (i.e., the transport layer) is a layer that, e.g., manages end-to-end control and error-checking, etc.

Layer-3 (i.e., the network layer) is a layer that, e.g., handles routing and forwarding, etc.

Layer-2 (i.e., the data-link layer) is a layer that, e.g., provides synchronization for the physical level, does bit-stuffing and furnishes transmission protocol knowledge and management, etc. The Institute of Electrical and Electronics Engineers (IEEE) sub-divides the data-link layer into two further sub-layers, the MAC (Media Access Control) layer that controls the data transfer to and from the physical layer and the LLC (Logical Link Control) layer that interfaces with the network layer and interprets commands and performs error recovery.

Layer 1 (i.e., the physical layer) is a layer that, e.g., conveys the bit stream through the network at the physical level. The IEEE sub-divides the physical layer into the PLCP (Physical Layer Convergence Procedure) sub-layer and the PMD (Physical Medium Dependent) sub-layer.

In this document, layers higher than layer-2 (such as, e.g., layers including the network layer or layer-3 in the OSI model and the like) are referred to as the higher-layers.

Wireless Networks

Wireless networks can incorporate a variety of types of mobile devices, such as, e.g., cellular and wireless telephones, PCs (personal computers), laptop computers, wearable computers, cordless phones, pagers, headsets, printers, PDAs, etc. For example, mobile devices may include digital systems to secure fast wireless transmissions of voice and/or data. Typical mobile devices include some or all of the following components: a transceiver (i.e., a transmitter and a receiver, including, e.g., a single chip transceiver with an integrated transmitter, receiver and, if desired, other functions); an antenna; a processor; one or more audio transducers (for example, a speaker or a microphone as in devices for audio communications); electromagnetic data storage (such as, e.g., ROM, RAM, digital data storage, etc., such as in devices where data processing is provided); memory; flash memory; a full chip set or integrated circuit; interfaces (such as, e.g., USB, CODEC, UART, PCM, etc.); and/or the like.

Wireless LANs (WLANS) in which a mobile user can connect to a local area network (LAN) through a wireless connection may be employed for wireless communications. Wireless communications can include, e.g., communications that propagate via electromagnetic waves, such as light, infrared, radio, microwave. There are a variety of WLAN standards that currently exist, such as, e.g., Bluetooth, IEEE 802.11, and HomeRF.

By way of example, Bluetooth products may be used to provide links between mobile computers, mobile phones, portable handheld devices, personal digital assistants (PDAs), and other mobile devices and connectivity to the Internet. Bluetooth is a computing and telecommunications industry specification that details how mobile devices can easily interconnect with each other and with non-mobile devices using a short-range wireless connection. Bluetooth creates a digital wireless protocol to address end-user problems arising from the proliferation of various mobile devices that need to keep data synchronized and consistent from one device to another, thereby allowing equipment from different vendors to work seamlessly together. Bluetooth devices may be named according to a common naming concept. For example, a Bluetooth device may possess a Bluetooth Device Name (BDN) or a name associated with a unique Bluetooth Device Address (BDA). Bluetooth devices may also participate in an Internet Protocol (IP) network. If a Bluetooth device functions on an IP network, it may be provided with an IP address and an IP (network) name. Thus, a Bluetooth Device configured to participate on an IP network may contain, e.g., a BDN, a BDA, an IP address and an IP name. The term "IP name" refers to a name corresponding to an IP address of an interface.

An IEEE standard, IEEE 802.11, specifies technologies for wireless LANs and devices. Using 802.11, wireless networking may be accomplished with each single base station supporting several devices. In some examples, devices may come pre-equipped with wireless hardware or a user may install a separate piece of hardware, such as a card, that may include an antenna. By way of example, devices used in 802.11 typically include three notable elements, whether or not the device is an access point (AP), a mobile station (STA), a bridge, a PCMCIA card or another device: a radio transceiver; an antenna; and a MAC (Media Access Control) layer that controls packet flow between points in a network.

In addition, Multiple Interface Devices (MIDs) may be utilized in some wireless networks. MIDs may contain two independent network interfaces, such as a Bluetooth interface and an 802.11 interface, thus allowing the MID to participate on two separate networks as well as to interface with Bluetooth devices. The MID may have an IP address and a common IP (network) name associated with the IP address.

Wireless network devices may include, but are not limited to Bluetooth devices, Multiple Interface Devices (MIDs), 802.11X devices (IEEE 802.11 devices including, e.g., 802.11a, 802.11b and 802.11g devices), HomeRF (Home Radio Frequency) devices, Wi-Fi (Wireless Fidelity) devices, GPRS (General Packet Radio Service) devices, 3G cellular devices, 2.5G cellular devices, GSM (Global System for Mobile Communications) devices, EDGE (Enhanced Data for GSM Evolution) devices, TDMA type (Time Division Multiple Access) devices, or CDMA type (Code Division Multiple Access) devices, including CDMA2000. Each network device may contain addresses of varying types including but not limited to an IP address, a Bluetooth Device Address, a Bluetooth Common Name, a Bluetooth IP address, a Bluetooth IP Common Name, an 802.11 IP Address, an 802.11 IP common Name, or an IEEE MAC address.

Wireless networks can also involve methods and protocols found in, e.g., Mobile IP (Internet Protocol) systems, in PCS systems, and in other mobile network systems. With respect to Mobile IP, this involves a standard communications protocol created by the Internet Engineering Task Force (IETF). With Mobile IP, mobile device users can move across networks while maintaining their IP Address assigned once. See Request for Comments (RFC) 3344. NB: RFCs are formal documents of the Internet Engineering Task Force (IETF). Mobile IP enhances Internet Protocol (IP) and adds means to forward Internet traffic to mobile devices when connecting outside their home network. Mobile IP assigns each mobile node a home address on its home network and a care-of-address (CoA) that identifies the current location of the device within a network and its subnets. When a device is moved to a different network, it receives a new care-of address. A mobility agent on the home network can associate each home address with its care-of address. The mobile node can send the home agent a binding update each time it changes its care-of address using, e.g., Internet Control Message Protocol (ICMP).

In basic IP routing (i.e. outside mobile IP), routing mechanisms rely on the assumptions that each network node always has a constant attachment point to, e.g., the Internet and that each node's IP address identifies the network link it is attached to. In this document, the terminology "node" includes a connection point, which can include, e.g., a redistribution point or an end point for data transmissions, and which can recognize, process and/or forward communications to other nodes. For example, Internet routers can look at, e.g., an IP address prefix or the like identifying a device's network. Then, at a network level, routers can look at, e.g., a set of bits identifying a particular subnet. Then, at a subnet level, routers can look at, e.g., a set of bits identifying a particular device. With typical mobile IP communications, if a user disconnects a mobile device from, e.g., the Internet and tries to reconnect it at a new subnet, then the device has to be reconfigured with a new IP address, a proper netmask and a default router. Otherwise, routing protocols would not be able to deliver the packets properly.

Handoffs and Changing Network Attachment Points

A handoff is an act in which a mobile station changes its network attachment point from one point to another, where network attachment points can include, e.g., base stations and IP (Internet Protocol) routers. When a handoff occurs with a change in attaching, for example, base stations and IP routers, it typically includes a layer-2 handoff and a layer-3 handoff, respectively. The layer-2 handoff and the layer-3 handoff occur at about the same time. During any handoff, the system needs to re-establish states maintained between the mobile station and the new network attachment point. These states related to handoff are also referred to as handoff contexts or simply as "contexts."

There are two types of contexts, transferable contexts and non-transferable contexts. The transferable contexts are transferable between the old and new attachment points while the non-transferable contexts need to be established either from scratch or by using transferable contexts. Illustrative transferable contexts can include, e.g., authentication contexts that are used, e.g., for re-authenticating the mobile and QoS (Quality of Service) contexts that are used, e.g., for allocating network resources sufficiently to provide a particular grade of service for the mobile. A dynamically assigned IP address of the mobile is an illustrative non-transferable context. Layer-2 and layer-3 cipher keys, such as TKIP (Temporal Key Integrity Protocol) and CCMP (Counter mode with CBC-MAC Protocol) cipher keys in 802.11i (see, e.g., Reference #11 incorporated herein below) and IPsec AH (Authentication Header) and ESP (Encapsulation Security Payload) cipher keys (see, e.g., References #15, #16 and #17 incorporated herein below) that are used for protecting data packets transmitted between the mobile station and an access point (AP) or router, are other illustrative non-transferable contexts, since those keys are associated with a particular pair of MAC (Media Access Control) or IP addresses of the two entities and need to be re-established based on negotiations between them.

For reference, as discussed above, 802.11 is a family of specifications for wireless local area networks (WLANs)

developed by a working group of the Institute of Electrical and Electronics Engineers (IEEE), which includes, e.g., specifications in the families 802.11, 802.11a, 802.11b, and 802.11g which use ethernet protocol and CSMA/CA (carrier sense multiple access with collision avoidance) for path sharing. See, e.g., Reference #13 incorporated herein below. In addition, 802.11i is a developing IEEE standard for security in WLANs. In addition, IPsec (Internet Protocol Security) is a framework for a set of protocols for security at the network or packet processing layer of network communication. In addition, a MAC address involves, e.g., a device's unique hardware address and can be used by the media access control sub-layer of the data-link layer, while an IP address involves, e.g., a number that identifies each sender or receiver of information that is sent in packets across, e.g., the Internet (such as, e.g., a 32 bit number in the most widely installed level of the Internet Protocol [IP], a 128 bit number in IPv6, a Classless Inter-Domain Routing (CIDR) network address and/or the like).

Transferring the transferable contexts from one network attachment point to another, before or after handoff, can reduce the handoff delay. A number of protocols, such as, e.g., IEEE 802.11f protocol (i.e., 802.11f is an inter AP protocol for exchange of information between 802.11 access points, such as information related to a mobile station between access points—see, e.g., Reference #12 incorporated herein below) and an IP-layer Context Transfer Protocol (see, e.g., Reference #14 incorporated herein below) can be used for this purpose. On the other hand, a delay for re-establishing non-transferable contexts is accumulated over a series of negotiations on each context, though some of the non-transferable contexts may be negotiated in parallel. Among other things, this delay can be problematic.

There are two cases in which this delay for negotiating non-transferable contexts may not become a problem. The first case is where an underlying radio link-layer uses CDMA (Code Division Multiple Access). In this first case, it is possible for the mobile station to establish certain contexts with the new base station while it is still communicating via the old base station, by using a so called soft handoff mechanism in which different CDMA codes can be used by the mobile at the same time for communicating with the different base stations in an overlapping radio coverage. The second case is where the mobile station has multiple interfaces and the handoff occurs across the interfaces. In this second case, essentially the same effect as a CDMA soft handoff can be achieved by allowing these interfaces to be operated at the same time.

The non-transferable contexts are most problematic in environments where neither of the above two schemes is available. For example, a mobile station with a single IEEE 802.11 wireless LAN interface cannot use a CDMA soft handoff scheme or an interface-switching scheme.

In view of this problem, IEEE 802.11 TGi is developing a new scheme named pre-authentication in which an IEEE 802.11i station (STA) that has been authenticated to and associated with an access point (AP) is allowed to perform IEEE 802.1X authentication with other access points through the currently associated access point before it associates with them. The IEEE 802.11i pre-authentication also allows 802.11i cipher keys to be established between the station and the non-associated APs.

However, the applicability of IEEE 802.11i pre-authentication is limited to mobile stations and access points in the same LAN, since IEEE 802.1X is defined to operate in a LAN. The original 802.11i pre-authentication documentation (see, e.g., Reference #1 incorporated herein below) does not set forth details for extending IEEE 802.11i pre-authentication to operating over the IP-layer such that a mobile station can pre-authenticate to APs in different LANs.

For reference, 802.11i is a wireless networking standard that addresses some security concerns in 802.11 and 802.1X is a group of WLAN standards developed as part of overall IEEE 802.11 WLAN support (see, e.g., References #1 and #10 incorporated herein below). Under 802.11, the presence of the other access points can be detected through active or passive scanning. In passive scanning, the mobile stations scan for beacon signals (including, e.g., Service Set Identifiers [SSIDs] and other key information) from the APs, while in active scanning the mobile stations send probe frames to elicit probe responses from the APs. For further reference, 802.11i pre-authentication involves an authenticator entity that enforces authentication before allowing access, a supplicant device (e.g., a mobile station) that requests access to services available via the authenticator (e.g., an access point) and an authentication server (such as, e.g., a Remote Authentication Dial-in User Service server or the like) that performs an authentication function (i.e., checking credentials of the supplicant) and responds to the authenticator to identify if the supplicant is authorized or not. In some embodiments, the authenticator and the authenticator server can be collocated, but they can also be separate.

While a variety of systems and methods are known, there remains a need for improved systems and methods. The preferred embodiments provide substantial improvements over and/or advances beyond the above and/or other systems and methods, including, e.g., systems and methods described in the following references, the entire disclosures of which references are each incorporated herein by reference:

Reference #1: B. Aboba, "IEEE 802.1X Pre-Authentication", IEEE 802.11-02/389r1, June 2002.

Reference #2: B. Aboba and D. Simon, "PPP EAP TLS Authentication Protocol", RFC 2716, October 1999.

Reference #3: L. Blunk, J. Vollbrecht, B. Aboba, J. Carlson and H. Levkowetz, "Extensible Authentication Protocol (EAP), Internet-Draft, Work in progress (to obsolete RFC 2284), May 2003 (see, also, e.g., November, 2003 document).

Reference #4: R. Droms and W. Arbaugh, "Authentication for DHCP Messages", RFC 3118, June 2001.

Reference #5: R. Droms, "Dynamic Host Configuration Protocol," RFC 2131, March 1997.

Reference #6: P. Funk, S. Blake-Wilson, "EAP Tunneled TLS Authentication Protocol (EAP-TTLS)", Internet-Draft, Work in progress, November 2002 (see also, e.g., August, 2003 document).

Reference #7: D. Forsberg, Y. Ohba, B. Patil, H. Tschofenig and A. Yegin, "Protocol for Carrying Authentication for Network Access (PANA)", Internet-Draft, Work in progress, March 2003 (see also, e.g., October, 2003 document).

Reference #8: R. Glenn and S. Kent, "The Null Encryption Algorithm and Its Use With IPsec," RFC 2410, November 1998.

Reference #9: D. Harkins and D. Carrel, "The Internet Key Exchange (IKE)", RFC 2409, November 1998.

Reference #10: IEEE Standard for Local and Metropolitan Area Networks, "Port-Based Network Access Control", IEEE Std 802.1X-2001.

Reference #11: IEEE Standard for Local and Metropolitan Area Networks, "Wireless Medium Access Control (MAC) and physical layer (PHY) specifications: Medium Access Control (MAC) Security Enhancements," IEEE Std 802.11i/D4.0, May 2003 (see also, e.g., IEEE Std 802.11i/D7.0, October 2003 document).

Reference #12: IEEE Standard for Local and Metropolitan Area Networks, "Draft Recommended Practice for Multi-Vendor Access Point Interoperability via an Inter-Access Point Protocol Across Distribution Systems Supporting IEEE 802.11 Operation," IEEE P802.11F/D5, January 2003.

Reference #13: IEEE Standard for Local and Metropolitan Area Networks, "Wireless LAN Medium Access Control (MAC) and Physical Layer (PHY) Specifications," ANSI/IEEE Std 802.11, 1999 Edition, 1999.

Reference #14: J. Loughney, M. Nakhjiri, C. Perkins and R. Koodli, "Context Transfer Protocol," Internet-Draft, Work in progress, June 2003 (see also, e.g., October, 2003 document).

Reference #15: C. Kaufman, "Internet Key Exchange (IKEv2) Protocol", Internet-Draft, Work in progress, April 2003 (see also, e.g., Oct. 9, 2003 and January, 2004 documents).

Reference #16: S. Kent and R. Atkinson, "IP Authentication Header," RFC 2402, November 1998.

Reference #17: S. Kent and R. Atkinson, "IP Encapsulating Security Payload (ESP)," RFC 2406, November 1998.

Reference #18: T. Kivinen, "DHCP over IKE", Internet-Draft, Work in progress, April 2003.

Reference #20: M. Liebsch, A. Singh, H. Chaskar and D. Funato, "Candidate Access Router Discovery", Internet-Draft, work in Progress, March 2003 (see also, e.g., September, 2003 and November, 2003 documents).

Reference #21: A. Palekar, D. Simon, G. Zorn and S. Josefsson, "Protected EAP Protocol (PEAP)", Internet-Draft, Work in Progress, March 2003 (see also "Protected EAP Protocol (PEAP) Version 2," October, 2003).

Reference #22: B. Patel, B. Aboba, S. Kelly and V. Gupta, "Dynamic Host Configuration Protocol (DHCPv4) Configuration of IPsec Tunnel Mode", RFC 3456, January 2003.

Reference #23: J. Puthenkulam, V. Lortz, A. Palekar and D. Simon, "The Compound Authentication Binding Problem", Internet-Draft, Work in Progress, March 2003 (see also, e.g., October, 2003 document).

Reference #24: R. Seifert, "The Switch Book—The Complete Guide to LAN Switching Technology", Wiley Computer Publishing, ISBN 0-471-34586-5.

Reference #25: Y. Sheffer, H. Krawczyk and B. Aboba, "PIC, A Pre-IKE Credential Provisioning Protocol", Internet-Draft, Work in progress, October 2002.

Reference #26: H. Tschofenig, A. Yegin and D. Forsburg, "Bootstrapping RFC3118 Delayed Authentication using PANA", Internet-Draft, June 2003 (see also, e.g., October, 2003 document).

Reference #27: M. Kulkarni, A Patel and K. Leung, "Mobile IPv4 Dynamic Home Agent Assignment", IETF Internet-Draft, Jan. 8, 2004.

SUMMARY OF THE INVENTION

The preferred embodiments of the present invention can significantly improve upon existing methods and/or apparatuses.

In some illustrative embodiments, a novel system and method is provided that can, e.g., extend concepts of pre-authentication (such as, e.g., IEEE 802.1X pre-authentication) so as to operate across IP networks or subnetworks. In some preferred embodiments, a novel architecture includes one or both of two new mechanisms that can substantially improve, e.g., higher-layer handoff performance. A first mechanism is referred to as "pre-configuration," which allows a mobile device to pre-configure higher-layer information effective in candidate IP subnets prior to a handoff. A second mechanism is referred to as "virtual soft-handoff," which allows a mobile to send or receive packets through the candidate IP subnet(s) even before it actually performs a handoff to the candidate IP subnet(s).

According to some embodiments, a method is provided that includes: pre-configuring a mobile station with higher-layer information for a new candidate IP subnetwork while the mobile station is configured for communications with a present IP subnetwork. Preferably, the method further includes the mobile station sending or receiving packets through the candidate IP subnetwork before a handoff is performed to that new IP subnetwork.

According to some other embodiments, a method for minimizing interruption in handoff of a mobile station between access points in current and new subnetworks is provided that includes: obtaining pre-authentication for a mobile station that has a single wireless interface to work over an access point in the new subnetwork before dissociating with an access point in the current subnetwork. In some embodiments, the method further includes carrying the pre-authorization over an IP layer.

According to yet some other embodiments, a method is provided that includes: resolving an IP address of an access point in a new subnetwork when a mobile station is in a current subnetwork; and obtaining pre-authentication for the mobile station to work over the current and new subnetworks. In some embodiments, there are multiple new candidate subnetworks. Preferably, a mobile station can perform pre-authentication (e.g., both L2 authentication and higher-layer authentication) with one or more network entities in the networks where it may or may not move to in a future. In some embodiments, the method includes that the resolving includes a dynamic resolution of the IP address. In some embodiments, the method includes that the dynamic resolution includes having an access point beacon or probe response include an IP address. In some embodiments, the method includes that the resolving includes a static resolution of the IP address. In some embodiments, the access point in the new subnetwork does not support higher-layer pre-authentication and communicates with the mobile station via a proxy agent, and, in some embodiments, the access point in the new subnetwork supports higher-layer pre-authentication and communicates with the mobile station. In some of the preferred implementations, the access point in the new subnetwork communicates with the mobile remote station by using a higher-layer protocol that carries 802.1X frames.

According to yet some other embodiments, a method is provided that includes: reducing handoff delay of a mobile station by pre-establishing higher-layer contexts prior to handoff based on higher-layer pre-authentication. Preferably, the higher-layer contexts include a client network address (e.g., a client IP address) and/or the like. In some embodiments, the method further includes securing messages used for pre-establishing higher-layer contexts. In some embodiments, the method further includes using a higher-layer authentication protocol for deriving cipher keys for protecting higher-layer pre-configuration messages. In some embodiments, the method further includes performing layer-2 pre-configuration by using 802.1X pre-authentication and 802.1X over IP. In some embodiments, the method further includes using a single higher-layer authentication protocol for pre-establishing a plurality of the higher-layer contexts. In some embodiments, the method further includes using IKE or IKEv2 for pre-establishing a plurality of the higher-layer contexts. In some embodiments, the method further includes using PANA and IKE or IKEv2 for pre-establishing a plurality of the higher-layer contexts. In some embodiments, the method further includes establishing an IPsec tunnel between the mobile station and an access point in a new subnetwork for redirecting traffic for a pre-configured IP address of the mobile station to a currently attached subnetwork.

According to yet some other embodiments, a method for performing a handoff of a mobile station between access points in different access networks with minimal interruption and with maintained security is provided that includes: pre-establishing higher-layer contexts for the mobile station prior to handoff and securely redirecting traffic originated from or destined for a pre-established IP address to a new access network. In some embodiments, the method further includes establishing an IPsec tunnel between the mobile station and an access router in the new access network, where an IPsec tunnel inner address is bound to the pre-established IP address. In some embodiments, the method further includes that an access router in the new access network is used as a temporal home agent with which a client device registers its pre-established IP address as a home address and the IP address assigned in a physically attached network as the care-of address.

According to yet some other embodiments, a method is provided that includes: performing higher-layer pre-authentication, pre-configuration and data traffic redirection to reduce or eliminate timing dependency of a higher-layer handoff on a lower-layer handoff of a mobile station between access networks. According to various embodiments, the handoff is a mobile IP handoff, a VPN handoff, an OSI network layer handoff, and/or the like. In some embodiments, the method further includes initiating the higher-layer handoff earlier than the lower-layer handoff. In some embodiments, the method further includes completing the higher layer handoff entirely before the lower layer handoff.

According to yet some other embodiments, a method is provided that includes: performing a virtual soft handoff of a mobile device between access points in proximate networks or subnetworks to minimize communication interruption by allowing the mobile device to send and receive packets from a new one of the access points prior to handoff. In some embodiments, the method further includes performing a higher layer handoff entirely before a lower layer handoff. In some embodiments, the method further includes further reducing communication interruption using a lower-layer CDMA soft handoff. In some embodiments, the method further includes controlling a layer-2 handoff timing by a higher layer so that pre-authentication and pre-configuration can be completed prior to starting layer-2 handoff. In some embodiments, the method further includes using an IPsec tunnel for traffic redirection during a virtual soft-handoff, with outer and inner IP addresses of a device for the IPsec tunnel being a care-of address in the current subnet and the care-of address in a new subnet, respectively. In some embodiments, the method further includes using an IPsec tunnel for all traffic.

According to yet some other embodiments, a mobile communications network node is provided that includes: a) a transceiver; and b) means for sending or receiving a network address to or from another mobile communications network node in a different network or subnetwork for higher-layer pre-authentication between the mobile communications network node and the another mobile communications network node while the nodes are in the different networks or subnetworks. In some embodiments, the mobile communications network node is a mobile node, while, in other embodiments, the mobile communications network node is an access point.

In some embodiments, the node further includes means for storing higher-layer contexts for a security association with the other mobile communications network node while the nodes are in the different networks or subnetworks. In some embodiments, the node further includes means for establishing higher-layer contexts for a security association with the other mobile communications network node while the nodes are in the different networks or subnetworks. In some embodiments, the node further includes means for performing a virtual soft handoff between the different networks or subnetworks by allowing a mobile one of the nodes to send or receive traffic to the other of the nodes prior to handoff.

The above and/or other aspects, features and/or advantages of various embodiments will be further appreciated in view of the following description in conjunction with the accompanying figures. Various embodiments can include and/or exclude different aspects, features and/or advantages where applicable. In addition, various embodiments can combine one or more aspect or feature of other embodiments where applicable. The descriptions of aspects, features and/or advantages of particular embodiments should not be construed as limiting other embodiments or the claims.

BRIEF DESCRIPTION OF THE DRAWINGS

The preferred embodiments of the present invention are shown by a way of example, and not limitation, in the accompanying figures, in which:

FIGS. 3 and 4 are schematic flow diagrams showing examples of higher-layer pre-configuration using combinations of PANA and IKE, wherein FIG. 3 shows a combination of PANA and the original IKE and FIG. 4 shows a combination of PANA and IKEv2 under illustrative conditions in which the configuration server is assumed to be co-located on the access router;

DETAILED DESCRIPTION OF THE PREFERRED EMBODIMENTS

While the present invention may be embodied in many different forms, a number of illustrative embodiments are described herein with the understanding that the present disclosure is to be considered as providing examples of the principles of the invention and that such examples are not intended to limit the invention to preferred embodiments described herein and/or illustrated herein. By way of example, while illustrative embodiments implemented within 802.11i and/or other environments are described herein, aspects of the present invention can be implemented within a variety of other environments as would be appreciated based on this disclosure.

IEEE 802.11i Pre-Authentication

Figure 1:
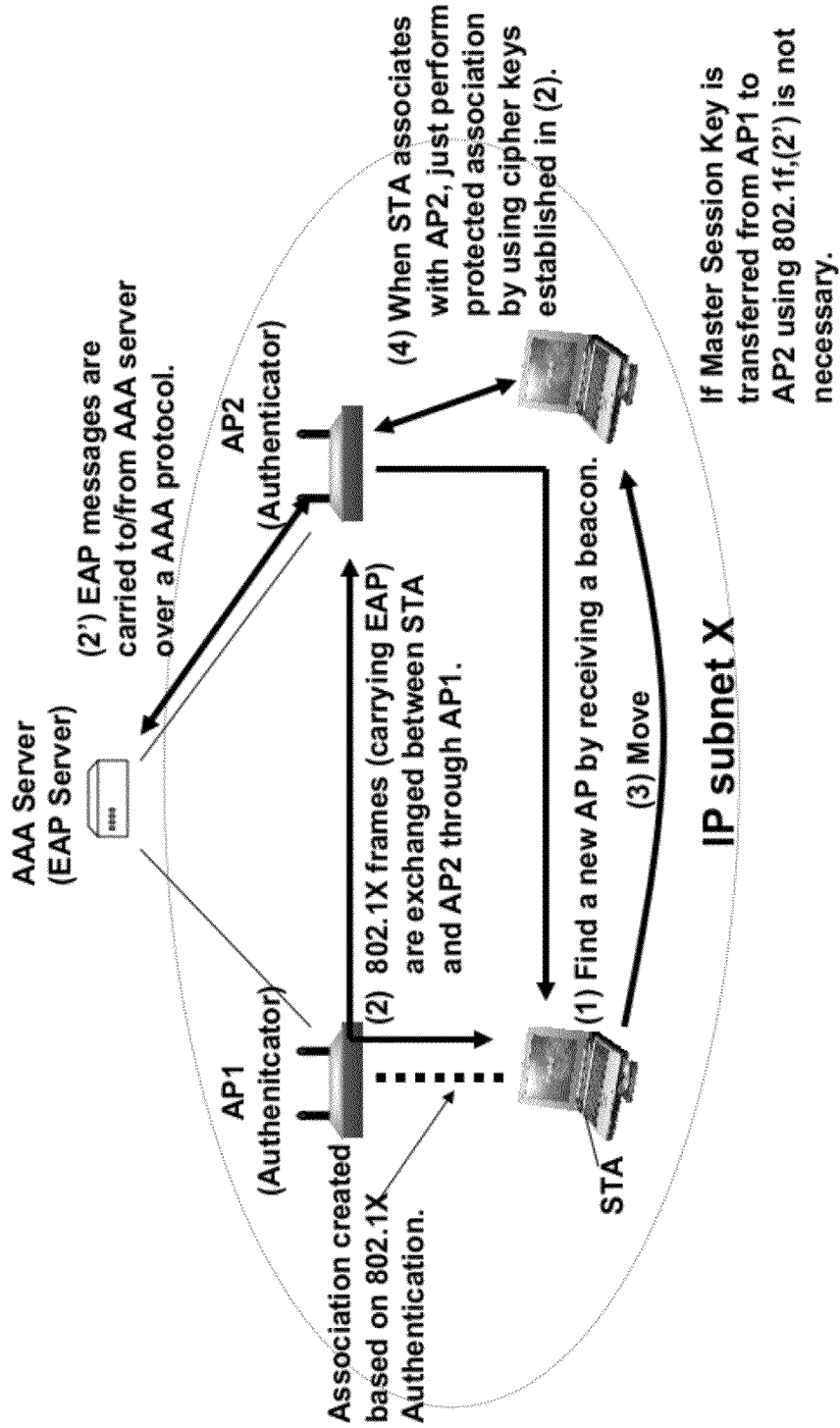
FIG. 1 is a schematic diagram that shows an illustrative sequence of IEEE 802.11i pre-authentication.

FIG. 1 shows an illustrative sequence of IEEE 802.11i pre-authentication. FIG. 1 assumes that the mobile station has already performed 802.11i authentication and has associated with a first access point AP1.

As shown at (1) in FIG. 1, the mobile station finds a new access point by receiving a beacon. In this regard, when the mobile station (STA) enters the radio coverage of a second access point AP2 and receives a beacon frame from AP2 and it wishes to pre-authenticate to AP2, it can send an EAPOL-Start (Extensible Authentication Protocol [EAP] over LAN) to AP1 with specifying the AP2's MAC address contained in the beacon frame as the destination MAC address. For reference, a beacon frame enables stations to establish and maintain communications on a wireless LAN. By way of example, a common beacon frame can be about fifty bytes long. About half of the beacon frame can include, e.g., a common frame header and cyclic redundancy checking (CRC) field. Like other frames, the header can include source and destination MAC addresses and also other information regarding the communications process. About the other half of the beacon's frame body can, e.g., reside between the header and the CRC field and can carry, e.g., the following information in the frame body: beacon interval (e.g., representing an amount of time between beacon transmissions); timestamp (e.g., enabling synchronization among stations associated with an AP); a service set identifier (SSID) (e.g., identifying a specific wireless LAN); supported rates (e.g., rates that the particular wireless LAN supports); parameter sets (e.g., information about the specific signaling methods, etc.); capability information (e.g., identifying requirements of stations that wish to belong to the wireless LAN); and/or traffic indication map (TIM).

As shown at (2) in FIG. 1, 802.1X frames (carrying EAP) are exchanged between the mobile station and the new access point AP2 through the current access point AP1. In this regard, the current access point AP1 forwards an EAPOL-Start frame to the new access point AP2 through, e.g., a backend wired LAN. The new access point AP2 then receives the EAPOL-Start frame and subsequent 802.1X frames are exchanged between the new access point AP2 and the mobile station (STA) through the current access point AP1.

As shown at (3) in FIG. 1, the mobile station can be, e.g., moving from a first subnetwork or the like to a second subnetwork or the like during handoff.

As shown at (4) in FIG. 1, when a mobile station associates with the new access point it can perform protected association by using cipher keys established at (2) discussed above. In this regard, 802.11i cipher keys are also established between AP2 and the mobile as a result of successful pre-authentication. Unless 802.11f or IAPP (Inter-Access Point Protocol) is used between AP1 and AP2 (see, e.g., Reference #12, incorporated herein above), AP2 will need to contact the authentication or AAA server (NB: an AAA server can include a server program that handles user requests for access to computer resources and provides authentication, authorization or accounting [AAA] services, and devices or applications may communicate with the AAA server using, e.g., RADIUS client/server protocol and software) to authenticate the mobile station in the same way as was done during the initial authentication through AP1. However, re-authentication can be faster than the initial authentication if the authentication method used in EAP (Extensible Authentication Protocol—see, e.g., Reference #3, incorporated herein above) supports fast-reconnect or session resumption as is supported by PEAP (Protected EAP—see, e.g., Reference #21, incorporated herein above), EAP-TLS (EAP Transport Layer Security—see, e.g., Reference #2, incorporated herein above) and EAP-TTLS (EAP Tunneled TLS—see, e.g., Reference #6, incorporated herein above).

Since IEEE 802.1X is designed to operate within a LAN, the applicability of IEEE 802.1X pre-authentication is limited to intra-subnet handoff—unless, it is extended to operate at a higher-layer as per embodiments described below. This is a significant limitation in, e.g., a large enterprise where the network is likely to be partitioned into multiple VLANs (Virtual LANs) based on, for example, department or section boundaries, in order to improve security or to reduce broadcast traffic. If the mobile station is supposed to move, e.g., among multiple VLANs, supporting both inter-subnet and intra-subnet pre-authentication can be very advantageous.

Issues Related to Higher-Layer Pre-Authentication

Extending IEEE 802.11i pre-authentication to support inter-subnet pre-authentication is not straightforward, much less is extending it in such a manner to obtain the various benefits possible in various embodiments of the present invention. For example, one cannot merely encapsulate 802.1X frames in IP datagrams (NB: datagrams, or packets, are the message units that the Internet Protocol deals with and that the network transports). In some preferred embodiments of the invention, a number of additional issues are overcome in achieving aspects of the preferred embodiments, including for example:

The Ability to Resolve IP Address of AP: When a mobile station finds an AP that may or may not be on the same LAN as the mobile station, it needs to know whether the AP is on the same LAN. And, if the AP is not on the same LAN, it needs to know the IP address of the AP in order to communicate by using a higher-layer protocol.

The Ability to Support Higher-Layer Pre-Authentication: Support may be needed for APs that do not support higher-layer pre-authentication. In this regard, some APs may support 802.11i pre-authentication, but may not support higher-layer pre-authentication. Such APs assume that mobile stations being pre-authenticated are on the same LAN. It may be necessary to enable such APs to benefit from higher-layer pre-authentication.

The Ability to Carry Messages Over IP: EAP requires its transport protocols to provide orderly delivery. See, e.g., Reference #3 incorporated herein above. In this regard, IEEE 802.1X satisfies the orderly delivery requirement of EAP because IEEE 802 LAN switches are required to maintain the ordering invariant. See, e.g., Reference #24 incorporated herein above. On the other hand, when EAP messages are carried at a higher-layer, the EAP transport protocol defined over the IP-layer must provide orderly delivery since the IP-layer does not maintain the ordering invariant.

The Ability to Pre-Establish Higher Contexts: In order to perform an inter-subnet handoff, the mobile station not only needs to re-establish layer-2 contexts but also the mobile station needs to re-establish higher-layer contexts including, e.g., an IP care-of address and IPsec Security Associations (SAs) between the mobile and, e.g., the access router(s) (ARs) when IP-layer per-packet protection is used. These higher-layer contexts are likely to take more time to establish than layer-2 contexts. It can, thus, be helpful to have these contexts pre-established prior to a handoff in order to reduce the handoff delay and the resulting data loss. Since the higher-layer contexts are not established by using IEEE 802.1X, an additional mechanism needs to be defined at the higher-layer to pre-establish them.

The Ability to Achieve Even Further Performance Advances: The ability to pre-establish higher-layer contexts by using higher-layer pre-authentication can help reduce handoff delay and resulting data losses. However, the present inventors have found that even further improvements in performance can be achieved if the mobile station can send and/or receive higher-layer packets based not only on the current contexts but also on the pre-established contexts even before it performs a layer-2 handoff.

Detailed solutions related to, inter alia, the above issues are set forth in the following sections.

Resolving IP Address of AP

As mentioned above, since higher-layer pre-authentication needs to work across multiple LANs, a mobile station needs to be able to communicate with access points in different LANs. Thus, there is a need to resolve the mapping between the IP address and the MAC address of the AP. As described below, in some cases, the IP address may be an address of a proxy agent. There are two preferred approaches for AP resolution: pre-configured resolution (e.g., static resolution) and dynamic resolution. In static resolution, a mobile station can, e.g., obtain a list of pairs of IP address and MAC address of each nearby AP before it receives beacon frames from those APs. In dynamic resolution, the mapping for an AP can be, e.g., resolved when the mobile station receives a beacon frame or the like from the AP. In some embodiments, both approaches can be combined. A number of illustrative methods that can be employed are listed below.

In some embodiments, the 802.11 specification may be extended so that beacon frames (or probe responses or the like) can contain the IP address for the MAC address of the AP. As per the above, this can be categorized as a dynamic resolution.

In some embodiments, the CARD (Candidate Access Router Discovery) mechanism of the IETF Seamoby WG (Working Group) can be used for this purpose. See, e.g., M. Liebsch, A. Singh, H. Chaskar and D. Funato, "Candidate Access Router Discovery", Internet-Draft, work in Progress, March 2003, incorporated herein above. As per the above, this can be categorized as a dynamic resolution.

In some embodiments, DHCP (Dynamic Host Configuration Protocol) with a new option that carries the list of pairs of the MAC address and the IP address for each nearby AP can be used for this purpose. See, e.g., R. Droms, "Dynamic Host Configuration Protocol," RFC 2131, March 1997, incorporated herein above. As per the above, this can be categorized as a static resolution.

In some embodiments, EAP-TLV (EAP Type-Length-Value) methods can be used to carry the list of pairs of the MAC address and IP address for each nearby AP for the desired resolution purposes. See, e.g., Reference #21, incorporated herein above. This EAP method is typically carried in a tunneling EAP method such as PEAP (see Id.) and the list may need to be sent from the tunneling end-point in a backend authentication server to achieve the desired resolution purposes. As per the above, this method can be categorized as a static resolution.

In some embodiments, the PANA protocol can be used for this purpose by adding a new AVP (Attribute-Value Pair) in the message (i.e., PANA-Bind-Request) that is used for informing a mobile client of the authentication result.

In some embodiments, IEEE 802.1X, PPP (Point-to-Point Protocol) and/or other link-layer authentication protocol can be used for this purpose.

In the most preferred embodiments, an access point resolution should work to resolve the mapping between MAC and IP addresses of access points in different administrative domains. In considering such multi-domain scenarios, the first approach listed above works particularly well for such inter-domain handoff scenarios. However, other approaches are still useful, if the mobile node memorizes the IP address and the MAC address of each access point when it attaches to the new network through the above or other similar approaches. These approaches can also be useful to define an IP address of a configuration server described below.

In addition to the issue of resolving an IP Address of an AP, there are also parallel issues of resolving: a) an IP Address of a PANA Authentication Agent that is co-located with or located behind the AP (i.e., the PANA Authentication Agent may be used for higher-layer pre-authentication); b) an IP prefix of the AP (i.e., the IP address of the AP may not be sufficient for a client to know whether the AP belong to the same network as the client or not); and/or c) the Domain name of the AP.

To address such parallel issues, in addition to the IP address of the AP, one or more IP prefix of the subnetwork(s) to which the AP belongs, one or more IP address of PANA authentication agent(s) co-located with or connected in the same subnetwork(s) as the AP, the domain name of the AP and/or any other information that is needed for performing higher-layer pre-authentication, pre-configuration of higher-layer contexts and/or virtual soft handoff may also be resolved together with the IP address of the AP.

IEEE 802.1X Proxy

Figure 2A:
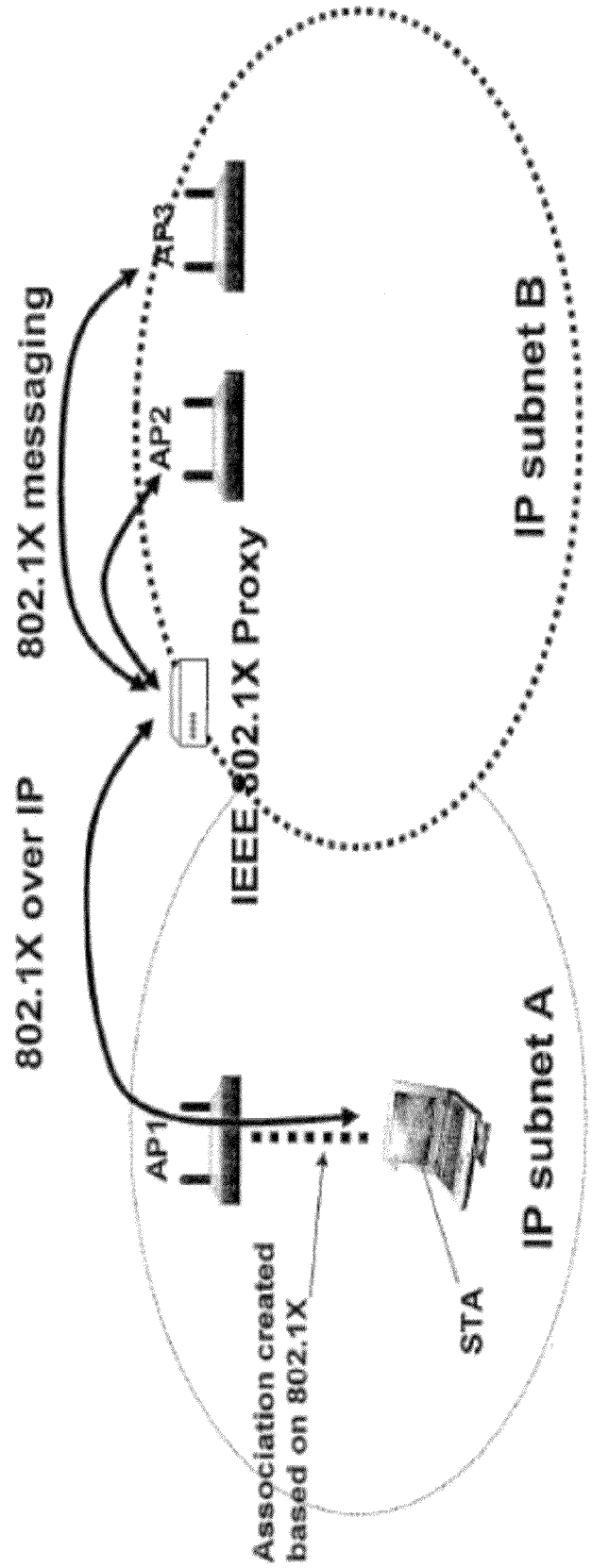
FIG. 2(A) is a diagram demonstrating the use of an intermediate proxy agent.

As indicated above, some access points may support 802.11i pre-authentication, but may not support higher-layer pre-authentication. As shown in FIG. 2(A), in some embodiments, an access point that does not support higher-layer pre-authentication can be made to communicate IEEE 802.1X frames with a mobile station STA in a remote LAN by introducing a proxy agent that forwards 802.1X messages between the access point and the remote mobile station. By way of example, a proxy agent can include a proxy server that acts as an intermediary. In some examples, such a proxy agent can be referred to as an IEEE 802.1X proxy. During operation, the IEEE 802.1X frame transfer between the IEEE 802.1X proxy and the access points can be based solely on IEEE 802 MAC mechanism, where the proxy uses the MAC address of the remote mobile station instead of its own MAC address so that the AP implementation of IEEE 802.11i pre-authentication can work without any change. The IEEE 802.1X frame transfer between the proxy and the mobile station can be based on a higher-layer transport mechanism that is discussed in the next subsection. Since the proxy does not see the MAC address of the remote mobile station in the header of a MAC layer frame received from the mobile station, the MAC address is preferably carried in the payload of higher-layer packets.

Figure 2B:
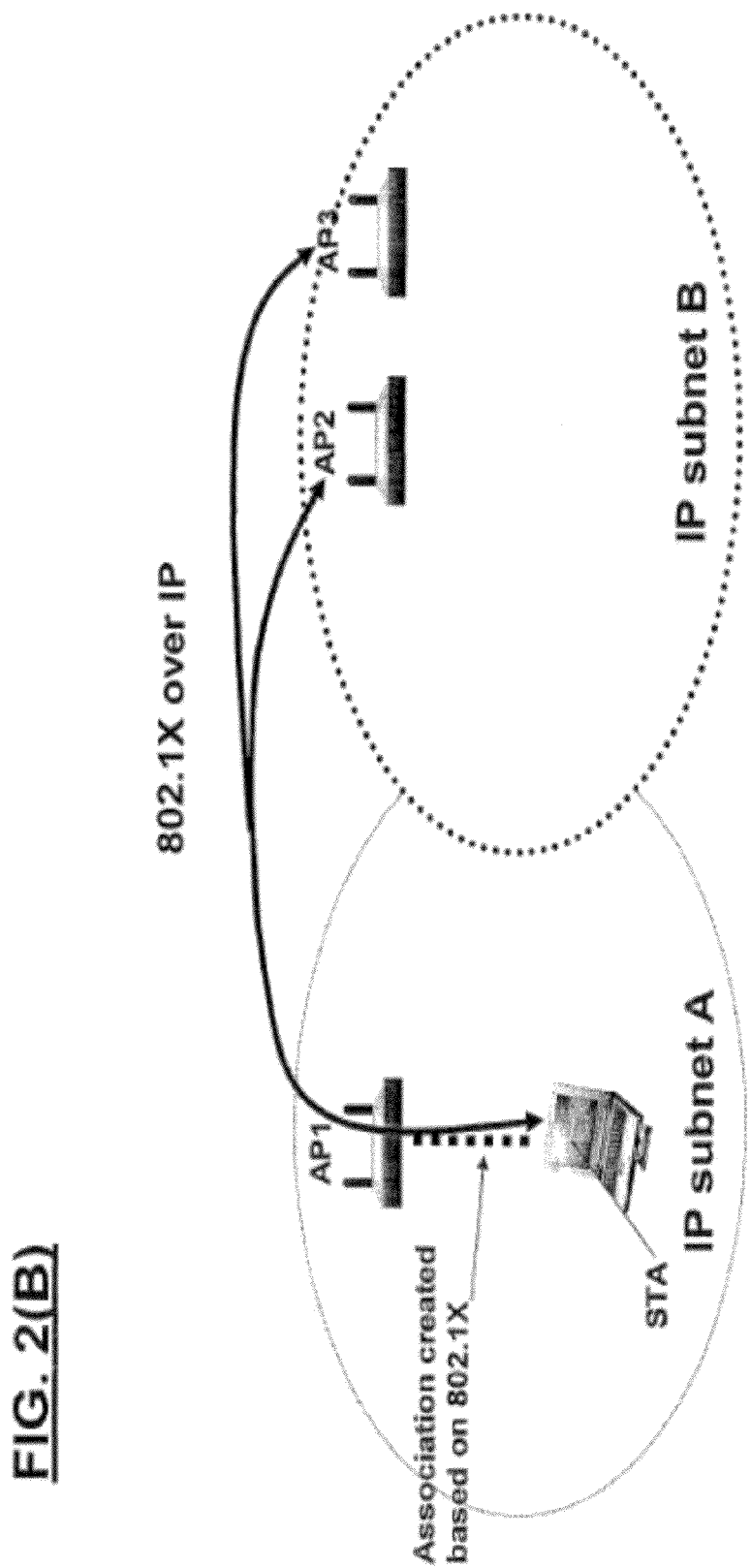
FIG. 2(B) is a diagram demonstrating the use of an access point that supports higher-layer pre-authentication.

On the other hand, as shown in FIG. 2(B), if an access point supports higher-layer pre-authentication, an IEEE 802.1X proxy is not needed. In such cases, such an AP can directly communicate with the remote mobile station (STA) by using a higher-layer protocol that carries 802.1X frames.

Thus, FIGS. 2(A) and 2(B) show two illustrative methods, with FIG. 2(A) demonstrating the use of an intermediate proxy agent and FIG. 2(B) demonstrating use of an access point that supports higher-layer pre-authentication. Therefore, in illustrative implementations of these embodiments, the mobile station just needs to know an IP address of either a proxy agent or of an AP.

IEEE 802.1X Over IP

As mentioned above, since IEEE 802.1X frames carry EAP (Extensible Authentication Protocol) messages for which order invariance needs to be maintained, simply carrying IEEE 802.1X frames over IP does not satisfy the EAP transport requirement. Accordingly, in order to carry 802.1X frames above the IP layer, one or more of the approaches listed below, or other appropriate methods, can be employed.

In some embodiments, PANA (Protocol for carrying Authentication for Network Access) can be used for carrying EAP messages over UDP (User Datagram Protocol). See, e.g., D. Forsberg, Y. Ohba, B. Patil, H. Tschofenig and A. Yegin, "Protocol for Carrying Authentication for Network Access (PANA)", Internet-Draft, Work in progress, March 2003, incorporated herein above. Since PANA is designed to carry EAP messages by nature, it has a mechanism to maintain order invariant.

In some embodiments, IKEv2 (Internet Key Exchange, version 2), which is also defined over UDP, supports carrying EAP messages to support various authentication methods to establish an IKE Security Association. IKEv2 satisfies the orderly delivery requirement since IKEv2 defines a reliable message delivery mechanism.

In some embodiments, a new protocol can be defined to carry 802.1X frames over a reliable transport, such as, e.g., TCP.

In some preferred embodiments, the latter approach (i.e., defining a new protocol) can be more suitable for the demand because the other two approaches may be functionally redundant considering the requirement of just carrying IEEE 802.1X frames with preserving EAP message order.

Pre-Establishing Higher-Layer Contexts

One purpose of pre-authentication includes providing a client device a means to pre-establish the contexts to be used for the target access network before it performs handoff to the target network. According to some preferred embodiments herein, the pre-established contexts include not only lower-layer contexts, but both lower-layer contexts, such as, e.g., layer-2 contexts such as, e.g., data encryption keys, 802.11i cipher keys, and/or the like, and higher-layer contexts, such as, e.g., a client IP address, an IP prefix, a subnet mask, a router address, a DNS (Domain Name System) server address, IPsec ciphers (if IPsec is used for data packet protection in the access network), and/or the like. Among other things, this novel pre-establishment of higher-layer contexts enables substantial advantages as detailed below. These contexts can be, e.g., stored (e.g., temporarily) in the mobile station or the like in, e.g., electromagnetic storage, RAM, cache memory or the like.

In this disclosure, pre-establishing contexts can also be referred to as "pre-configuration." While layer-2 pre-configuration can be done by, e.g., using 802.1X pre-authentication and 802.1X over IP, a mechanism needs to be defined for higher-layer pre-configuration. On the other hand, signaling messages used for higher-layer pre-configuration need to be secured between the client device and a configuration server to prevent unauthorized clients from, e.g., performing pre-configuration or launching DoS (Denial of Service) attacks on the pre-configuration message exchanges. Since it is likely in a roaming environment that there is no previously configured SA (Security Association) between the client and configuration server, the SA for securing the signaling for higher-layer pre-configuration is preferably dynamically derived in a similar way that is used, e.g., for deriving 802.11i cipher keys from a session key that is established between a mobile station and an access point as a result of successful 802.1X authentication. However, IKEv2 does not provide a client to dynamically find an IKEv2 server.

Although a client IPv6 address and an IPv6 prefix can be pre-established by using CARD (see, e.g., Reference #20, incorporated herein above), a preferred approach includes pre-establishing the contexts by using a single protocol that can be used for pre-establishing substantially all or all of these contexts. In this regard, IKE or IKEv2 can be used as an exemplary protocol that supports secure remote configuration of a client device while it is connected to another network. See, e.g., Reference #9, incorporated herein above. With respect to IKE, an extension to IKE defines a standard mechanism that is used for carrying DHCP (Dynamic Host Configuration Protocol) messages between a client host and a DHCP agent that is co-located on a remote IPsec gateway. See, e.g., Reference #22, incorporated herein above. With respect to IKEv2, IKEv2 has a configuration mechanism by default and allows an extension to carry DHCP messages in IKEv2 messages. See, e.g., Reference #18, incorporated herein above. IKE supports entity authentication but it assumes that the communicating peers have either a pre-shared secret or digital certificates with mandating mutual authentication. Thus, IKE is not as desirable for roaming environments. On the other hand, IKEv2 supports more flexible authentication by optionally carrying EAP messages during a first CHILD_SA exchange (see below) to support authentication for roaming clients. However, this would involve public-key based, heavy weight key exchange at least twice, one for establishing an IKE_SA (see below) and another for establishing an EAP master session key, to deal with the cryptographic key binding problem. See, e.g., Reference #23, incorporated herein above.

Figure 9:
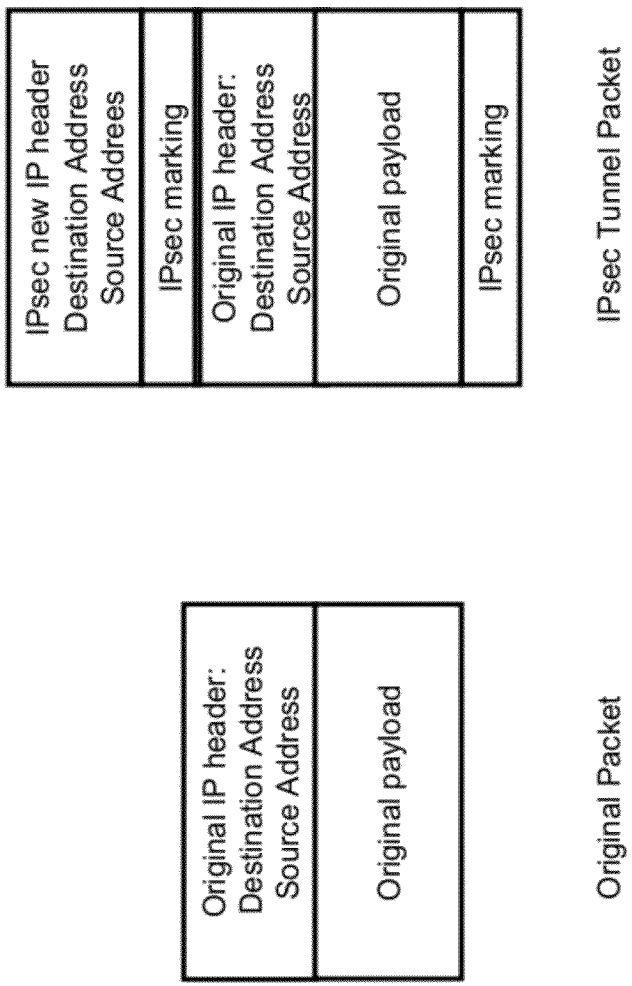
FIG. 9 shows an illustrative original packet and a new IPsec tunnel packet with its IPsec marking and with its new IP header.

For reference, IPsec (IP Security) can provide, e.g., confidentiality, data integrity, access control, and data source authentication to IP datagrams. These services are provided by maintaining shared state between a source (e.g., a data transmission sender) and a sink (e.g., a data transmission receiver) of an IP datagram. This state defines, inter alia, the specific services provided to the datagram, which cryptographic algorithms will be used to provide the services, and the keys used as input to the cryptographic algorithms. See, e.g., Reference #15. The basic idea of IPsec is to mark packets before sending and to use the mark upon receiving. The IPsec marking process involves some fields being added to the packet to be protected. For illustration, FIG. 9 shows an illustrative original packet and a new IPsec tunnel packet with its IPsec marking and with its new IP header. In IPsec, the two parties enter into a logical relationship called a Security Association (SA) in which they agree to parameters regarding algorithms and keys to be used. The Internet Key Exchange (IKE) protocol can establish this shared state dynamically. As indicated above, there are currently two versions of IKE, IKE and IKEv2. IKE performs mutual authentication between two parties and establishes an IKE security association that includes shared secret information that can be used to efficiently establish Security Associations for ESP (Encapsulation Security Payload) (see, e.g., RFC2406) and/or AH (Authentication Header) (see, e.g., RFC2402) and a set of cryptographic algorithms to be used to protect the SAs. An initiator can propose one or more suites (i.e., a complete set of algorithms used to protect an SA) by listing supported algorithms that can be combined into suites in a mix and match fashion.

For further reference, IKEv2 generates a Security Association called an "IKE_SA". The Secured Associations for ESP and/or AH that get set up through that IKE_SA are called "CHILD_SAs." See, e.g., Reference #15. IKE communications include a pair of messages: a request and a response. The pair is called an "exchange". IKE message flow includes a request followed by a response. It is the responsibility of the requester to ensure reliability. If the response is not received within a timeout interval, the requester retransmits the request (or else, abandons the connection). The first request/response of an IKE session negotiates security parameters for the IKE_SA, sends nonces, and sends Diffie-Hellman values. The initial exchange (i.e., request and response) is called IKE_SA_INIT. The second request and response, which is called IKE_AUTH, transmits identities, proves knowledge of the secrets corresponding to the two identities, and sets up an SA for the first AH and/or ESP CHILD_SA.

For further reference, IKE includes two different phases. A first phase (ph. 1), involves creating a protected environment (i.e., a Security Association) between the sender and the receiver to protect the negotiation of the authentication and encryption parameters to be used in the later data transfer phase. A second phase (ph. 2), involves negotiating the protection parameters to be used in the later data transfer phase. In this manner, among other things, the negotiation of parameters can also be protected.

In some embodiments, an advantageous approach includes using a higher-layer network access authentication protocol like, e.g., PANA (see, e.g., Reference #7, incorporated herein above) that supports clients to find a list of enforcement points or configuration servers (or IKEv2 servers in some embodiments). While PIC (A Pre-IKE Credential Provisioning Protocol) is designed to be used for establishing IKE credentials (see, e.g., Reference #25, incorporated herein above), PIC does not have a mechanism to solve a cryptographic binding problem. While in some PANA designs, it may be assumed that the PANA authentication agent must be on the same IP link as the client device, this is mainly for simplifying the PANA authentication agent discovery. However, PANA can be extended to work across multiple IP links by, e.g., configuring an IP-in-IP tunnel on the multiple IP links to construct a logical IP link between the PANA authentication agent and the client device or directly running PANA between clients and the PANA authentication agent without using an IP-in-IP tunnel.

Notably, PANA can be useful not only for deriving IKE credentials for pre-establishing higher-layer contexts but also for deriving credentials for DHCP authentication. See, e.g., Reference #4, incorporated herein above. IKE and IKEv2 may not be appropriate for configuration of a mobile client device that does not have any IP address, which could typically be the case when the mobile client device is initially connected to an access network. First, it is noted that protecting DHCP message exchanges with 802.11i ciphers between an access point and a mobile station does not really prevent, e.g., an insider that has been authenticated at the link layer from originating bogus DHCP messages. Accordingly, it is possible that a client device can be authenticated twice at different layers, one through IEEE 802.1X and the other thorough PANA. In this case, the fast-reconnect or session resumption mechanism that is supported by TLS (Transport Layer Security) based EAP authentication methods such as PEAP (see, e.g., Reference #21, incorporated herein above), EAP-TLS (see, e.g., Reference #2, incorporated herein above) and EAP-TTLS (see, e.g., Reference #6, incorporated herein above) can work across the different authentication layers in such a way that the same TLS session can be re-used for layer-2 authentication and higher-layer authentication between a backend authentication server and the mobile client device in order to reduce both authentication traffic and delay.

Figure 3:
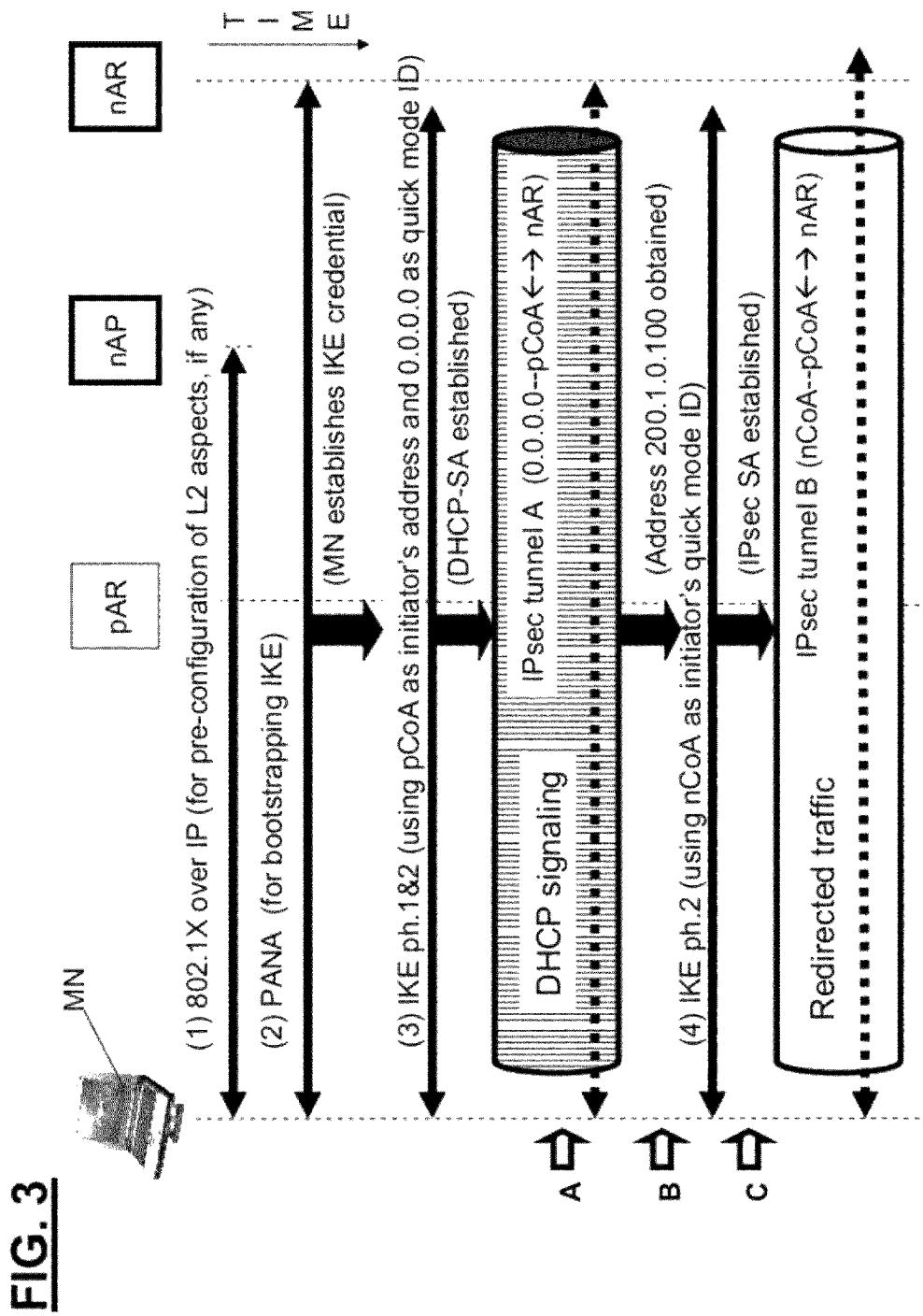
Figure 4:
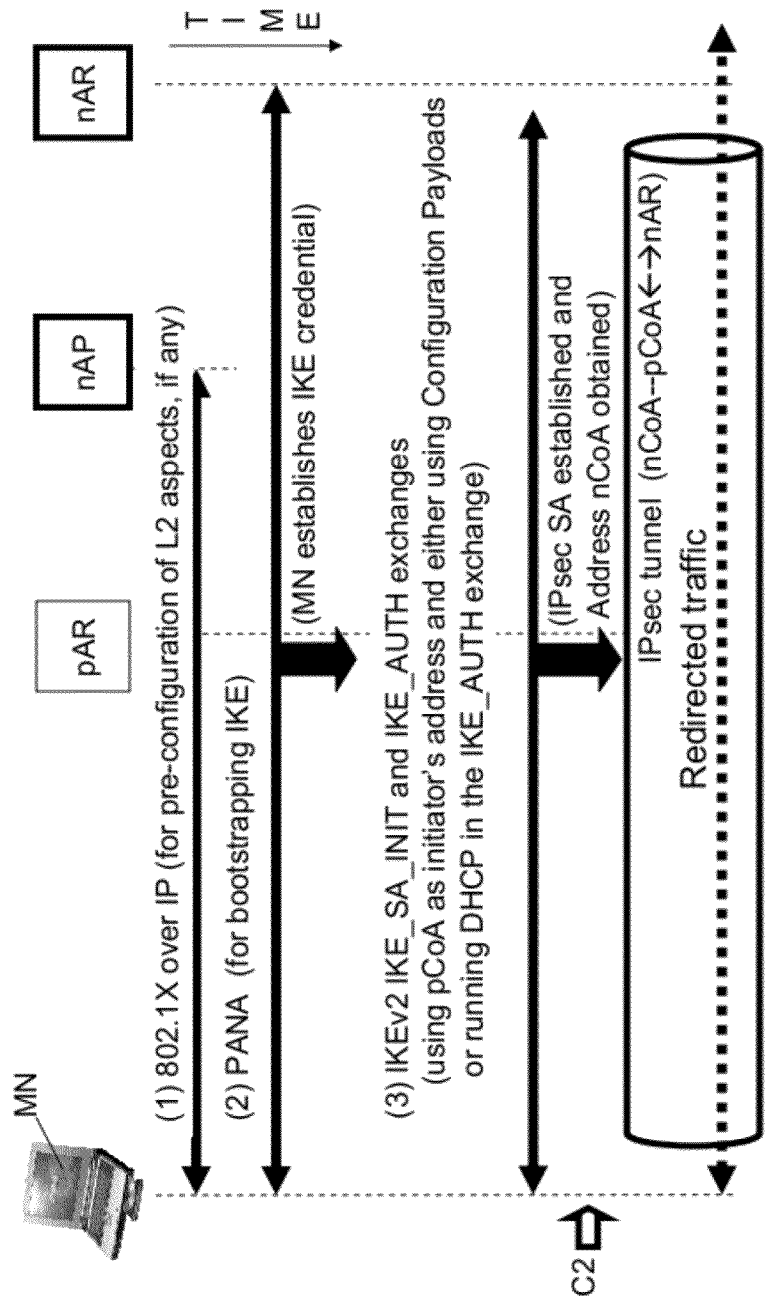

FIGS. 3 and 4 show some examples of higher-layer pre-configuration using combinations of PANA and IKE. In particular, FIG. 3 shows a combination of PANA and the original IKE and FIG. 4 shows a combination of PANA and IKEv2 under illustrative conditions in which the configuration server is assumed to be co-located on the access router. As illustrated, an IPsec tunnel that is bound to the pre-configured IP address can be established between the mobile client device and the access router in the new subnet. This IPsec tunnel can be used, e.g., for redirecting traffic for the pre-configured IP address of the mobile client device to the currently attached network to reduce the handoff delay and resulting data loss (such as, e.g., described in the next section).

With respect to the illustrative example shown in FIG. 3, pAR identifies a present access router, nAP identifies a new Access Point, nAR designates a new access router and MN designates a mobile node (which, typically, can also be referred to as, e.g., a mobile station, a mobile device or a mobile client). In FIG. 3, reference (1) illustrates the use of 802.1X over IP between a mobile node and a new AP (for the pre-configuration of L2 aspects, if any). Reference (2) illustrates using PANA for bootstrapping IKE, after which point the mobile node establishes the IKE credential. Reference (3) illustrates performing IKE phases 1 and 2, using pCoA as an initiator's address and, e.g., 0.0.0.0 as a quick mode ID, after which point a DHCP-SA is established. The tunnel at the point at arrow A is an IPsec tunnel. The configuration procedure occurs over this IPsec tunnel A. The IPsec tunnel A involves a secure tunnel passing through the present Access Router pAR. At the point at arrow B, the mobile node has the IP address that is assigned by the new Access Router nAR and now knows, e.g., the IP address in the new subnetwork and the contexts. In that regard, FIG. 3 shows an illustrative address 200.1.0.100. In addition, at this point, the mobile node still has such information related to the present subnetwork. Reference (4) then illustrates performing IKE phase 2, using nCoA as the initiator's quick mode ID. At the point at arrow C, an IPsec Security Association has been established and the mobile node MN has been configured to use the new subnet while it concurrently retains the configuration for the current subnet. Then, as shown, an IPsec tunnel can be established for redirected traffic represented by IPsec tunnel B (nCoA-pCoA⇔nAR).

With respect to the illustrative example shown in FIG. 4, pAR again identifies a present access router, nAP again identifies a new Access Point, nAR again designates a new access router and MN again designates a mobile node. In FIG. 4, reference (1) illustrates the use of 802.1X over IP between a mobile node and a new AP (for the pre-configuration of L2 aspects, if any). Reference (2) illustrates using PANA for bootstrapping IKE, after which point the mobile node establishes the IKE credential. Reference (3) illustrates IKE version 2 IKE_SA_INIT and IKE_AUTH exchanges, using pCoA as the initiator's address and either using Configuration Payloads or running DHCP in the IKE_AUTH exchange. Then, as shown, an IP Security Association (SA) is established and the new care of address nCoA is obtained. Thus, at the point C2 shown, the mobile client device has been configured to use the new subnet while it still retains the configuration for the current subnet. Then, as shown, an IPsec tunnel can be established for redirected traffic represented by IPsec tunnel (nCoA-pCoA⇋nAR).

Notably, the methodologies for pre-establishing higher-layer contexts described above in this subsection neither rely upon nor require a foundation of 802.1X and its pre-authentication in the network.

It should be appreciated that in preferred embodiments, a mobile client can perform pre-authentication (e.g., both L2 authentication and higher-layer authentication) with one or more network entities in the networks where it may or may not move to in a future. On the other hand, in the preferred embodiments, a virtual soft handoff is performed with only one network entity in a network where the mobile client is going to move.

Virtual Soft-Handoff

As discussed above, the use of, e.g., IKE or IKEv2 or the like for pre-establishing higher-layer contexts enables data traffic originated from or destined for the pre-established IP address of the client device (e.g., a mobile station) to be redirected securely to the access network to which the client device is being attached. This can be achieved, e.g., by establishing an IPsec tunnel between the client device and an AR (Access Router) in the target network, where the IPsec tunnel inner address of the device is bound to the pre-established IP address.

This is comparable to having an IPsec-based VPN (Virtual Private Network) tunnel between the client device and the access router. For reference, a VPN enables the use of a shared public infrastructure, such as, e.g., the Internet, while maintaining privacy through security procedures and tunneling protocols.

It is also possible to use, e.g., Mobile IP or Mobile IPv6 for traffic redirection in a way that an AR in the target network is used as a temporal home agent with which the mobile client device registers its pre-established IP address as the home address and the IP address assigned in the physically attached network as the care-of address. However, this approach should still use, e.g., IKE or IKEv2 or the like pre-configuration of the home address in the target network (see, e.g., Reference #27, incorporated herein above), while the above-discussed IPsec based solution does both pre-configuration and data traffic redirection. For reference, as discussed above, Mobile IP typically assigns each mobile node a home address on its home network and a care-of-address (CoA) that identifies the current location of the device within a network and its subnets. When a device is moved to a different network, it receives a new care-of address.

In various alternative embodiments, the IPsec tunnel used for traffic redirection between the client device and an AR does not need to be an encrypted tunnel while it should be integrity protected with replay protection, such as, for example, if cryptographic processing for data packet is a concern. In this case, the IPsec tunnel can use, e.g., a null encryption algorithm, with or without per-packet authentication. See, e.g., R. Glenn and S. Kent, "The Null Encryption Algorithm and Its Use With IPsec," RFC 2410, November 1998, incorporated herein above.

Among other things, the combination of pre-authentication, pre-configuration and the subsequent data traffic redirection can eliminate the timing dependency of higher-layer handoff (such as, e.g., in the cases of Mobile IP handoffs, VPN handoffs, etc.) on lower-layer handoff such that a higher-layer handoff can be performed even before performing the lower layer handoff. This technique of providing an early performance of a higher-layer handoff enables a "virtual soft-handoff" in which a mobile unit can send or receive packets or the like through a candidate network or subnetwork before a handoff. By using a virtual soft-handoff technique as per the preferred embodiments, it is possible to minimize the communication interruption during handoff to the extent that is incurred by the lowest level handoff or, in some cases, to even eliminate the communication interruption if, e.g., the lower-layer supports CDMA soft-handoff.

In the preferred embodiments, the virtual soft-handoff assumes that the layer-2 handoff timing can be controlled by the upper layer, so that the pre-authentication and the pre-configuration can be completed prior to starting the layer-2 handoff. In this regard, most wireless LAN card drivers provide API (Application Program Interface) for application programs to choose an AP among multiple APs with different SSIDs (Service Set Identifiers).

As explained above, a CDMA soft-handoff or handoff across multiple interfaces can provide similar functionality as a virtual soft-handoff. However, the virtual soft-handoff mechanism can work for substantially all types of client devices. Thus, the virtual soft-handoff mechanism has substantial advantages.

Figure 5:
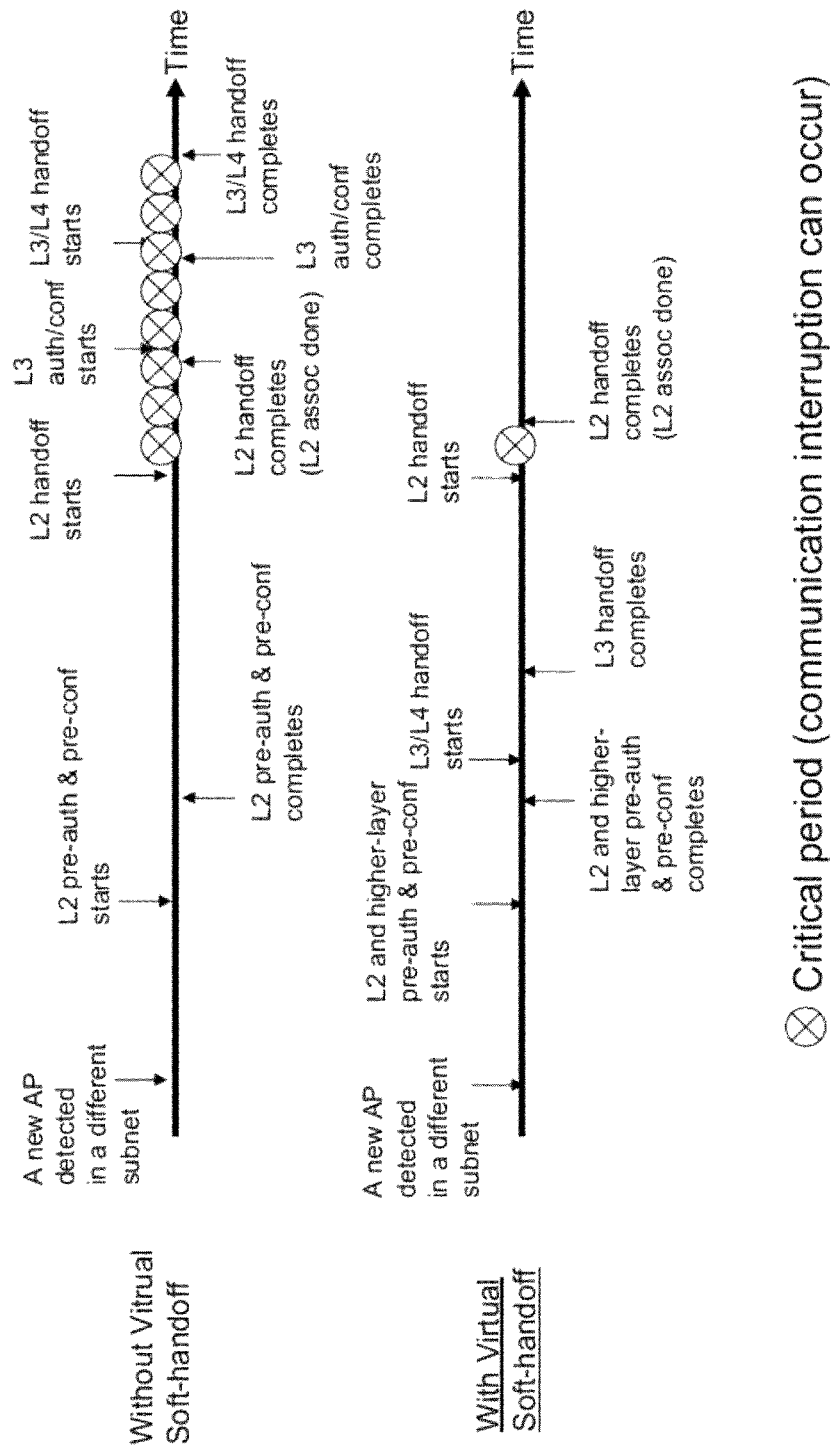
FIG. 5 shows schematic comparative time sequences when higher-layer soft handoff is not used (see top time-line) and when higher-layer soft handoff is used (see bottom time-line) according to some illustrative and non-limiting embodiments.

In this regard, FIG. 5 illustrates comparative time sequences that may be found when higher-layer soft handoff is not used (see top time-line) and when higher-layer soft handoff is used (see bottom time-line) according to some illustrative and non-limiting embodiments. These schematic timelines are for illustrative purposes only and are should not be construed as limiting the specific timing, etc., of various embodiments. For example, it should be understood that various steps may have sub-steps and that such sub-steps do not necessarily have to occur at the same time.

With reference to the top illustrative time-line, as shown the sequence starts when a new AP is detected in a new subnet (such as, e.g., via a beacon or probe response or the like). Then, layer-2 pre-authentication and pre-configuration starts. Then, layer-2 pre-authentication and pre-configuration completes. Then, the layer-2 handoff starts. Then, the layer-2 handoff completes and layer-2 association is done. At this delayed time after completion of the layer-2 handoff, the layer-3 authentication and configuration starts. Then, after further delay, the layer-3 authentication is completed. Then, the layer-3/layer-4 handoff begins. After a short time, the layer-3/layer-4 handoff is completed. As should apparent based on this illustrative time line, this methodology results in a significant critical period in which communication delays and communication interruption can occur.

With reference to the bottom illustrative time-line, as shown, the sequence similarly starts when a new AP is detected in a new subnet. Then, layer-2 and higher layer (i.e., layer(s) higher than layer-2) pre-authentication and pre-configuration starts. Among other things, the early initiation of higher layer pre-authentication and pre-configuration can result in time-savings and other advantageous (such as, e.g., described above). Then, the layer-2 and higher layer pre-authentication and pre-configuration are completed. Among other things, the early completion of higher layer pre-authentication and pre-configuration can result in further time-savings and other advantageous (such as, e.g., described above).

Once again, it should be understood that this is an illustrative, schematic and non-limiting time-line. Among other things, layer-2 and higher layer pre-authentication and pre-configuration may occur at various times. Then, the layer-3/layer-4 handoff starts (NB: as indicated above, various other embodiments can be implemented which do not have an early layer-3 and the like handoff while still obtaining other advantages discussed herein). Among other things, the early initiation of layer-3 and the like handoff can result in yet further time-savings and other advantageous (such as, e.g., described above). Then, the layer-3 and the like handoff can be completed. This early completion of the layer-3 and the like handoff can be used to effectively provide, e.g., a virtual soft handoff (as described above). Among other things, the early completion of layer-3 and the like handoff can result in yet further time-savings and other advantageous (such as, e.g., described above). Then, as shown, the layer-2 handoff can begin. And, after a short period, the layer-2 handoff can be completed. As should apparent based on this illustrative time line, this latter methodology results in a minimal critical period.

In some preferred embodiments, there are two illustrative cases for the IPsec-based virtual soft-handoff. The first illustrative case is based on using IPsec protection essentially for redirected traffic (i.e., for protecting traffic during redirect). The second illustrative case is based on using IPsec protection for protecting essentially all traffic (i.e., for protecting traffic during redirect and after moving to a new subnet).

Virtual Soft-Handoff Using IPsec for Redirected Traffic Only

Figure 6:
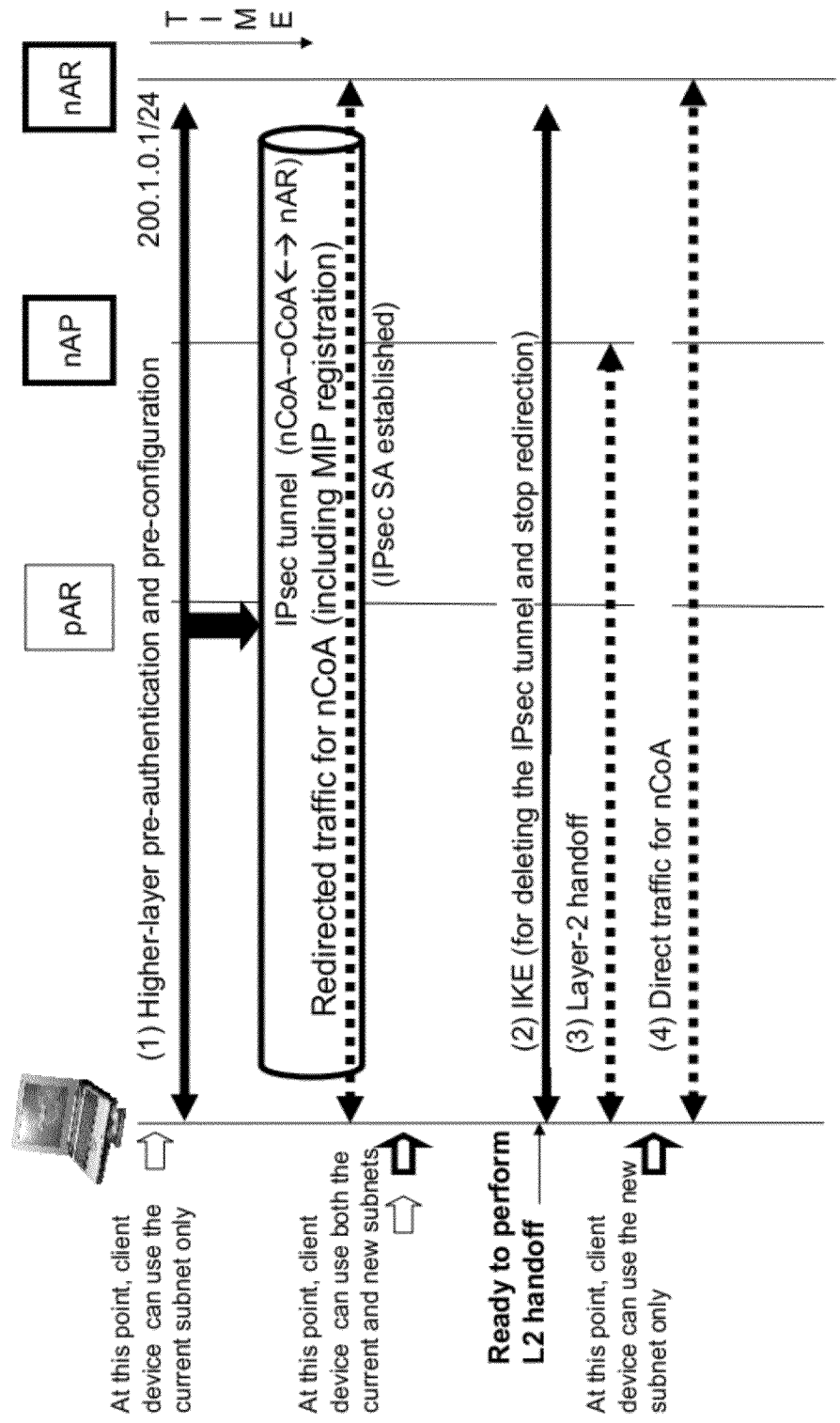
FIG. 6 shows a schematic flow diagram demonstrating a first illustrative case in which a mobile client device uses an IPsec tunnel for traffic redirection during a virtual soft-handoff.

FIG. 6 shows the first illustrative case in which a mobile client device uses an IPsec tunnel just for traffic redirection during a virtual soft-handoff. In this example, the IPsec tunnel is used for protection during handoff, while after handoff another form of protection (e.g., layer-2 protection) may be used, if desired, such as, e.g., encryption or the like. In the example shown in FIG. 6, the outer and inner IP addresses of the device for the IPsec tunnel is the care-of address in the present subnet (pCoA) and the care-of address in the new subnet (nCoA), respectively. With reference to FIG. 6, when the device is ready to perform a layer-2 handoff, it should delete the established IPsec tunnel before performing the layer-2 handoff so that the subsequent data traffic for the new IP address is directly forwarded through the new AP with which the device is going to associate. Without this operation, the traffic destined for nCoA can continue to be forwarded through the old AP even after the completion of layer-2 handoff. In addition, the new access router (nAR) should keep nCoA assigned to the mobile device, from being unauthorized for network access, or from being assigned to other devices even after the deletion of the tunnel, in order to avoid possible service theft by reusing the nCoA. This can be done, for example, by having a grace period for delaying the procedure to remove the authorized state for nCoA and to release the lease of CoA.

With reference to the illustrative embodiment shown in FIG. 6, at a point at which the mobile client device can only use a current subnet, as shown at reference (1), higher layer pre-authorization and pre-configuration can be carried out (as discussed above). Then, as shown, an IPsec tunnel can be established for redirected traffic for nCoA represented by IPsec tunnel (nCoA-pCoA⇔nAR). As shown, this could also be used for Mobile IP registration in some embodiments using Mobile IP. At this point, an IPsec Security Association has been established. Then, as shown at reference (2), the IPsec tunnel is deleted and redirection is stopped. This can be done, e.g., using IKE. Then, the layer-2 handoff is completed.

At this point, as shown at reference (3), the mobile client device can only use the new subnet. Then, as shown at reference (4), the direct traffic for nCoA is carried out between the new AR and the mobile client.

Virtual Soft-Handoff Using IPsec for All Traffic

Figure 7:
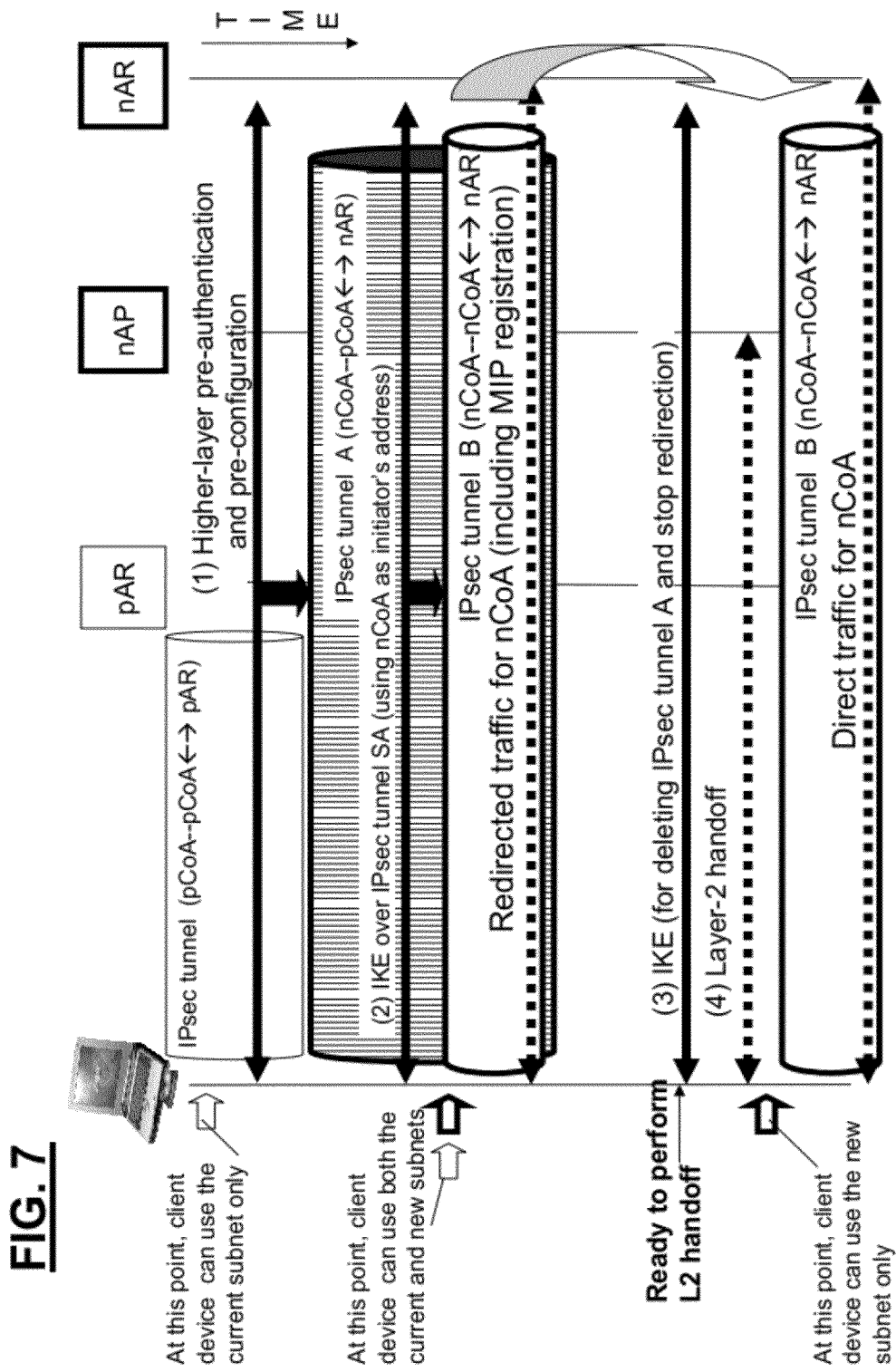
FIG. 7 shows a schematic flow diagram demonstrating a second illustrative case in which a virtual soft-handoff uses an IPsec tunnel for substantially all or all traffic.

FIG. 7 shows a second illustrative case in which a virtual soft-handoff uses an IPsec tunnel for all traffic. In this manner, a higher level of protection can be achieved by providing protective an IPsec tunnel during and even after a handoff. In this second example, both the outer and inner IP addresses of the device for the IPsec tunnel for the new subnet are the IP address of the device used for the new subnet (see, e.g., IPsec tunnel B shown in FIG. 7). As shown in FIG. 7, the horizontal cylinders represent IPsec tunnels. During a virtual soft-handoff, another IPsec tunnel is established (such as, e.g., the cross-hatched IPsec tunnel A shown in FIG. 7). The outer and inner IP addresses of the device for the IPsec tunnel A can be the same as that for the IPsec tunnel described in the previous section. Preferably, the IPsec tunnel for the new subnet is established by running IKE or IKEv2 over the latter IPsec tunnel. In this manner, among other things, some possible advantages that may be achieved can include that: (i) IPsec-based protection can be always or substantially always provided for mobile clients, with enhancing network layer security; and/or (ii) the lifetime of the care-of address can be substantially synchronized with the lifetime of the IPsec tunnel.

When the device is ready to perform a layer-2 handoff, it should delete the latter IPsec tunnel before performing the layer-2 handoff so that the IPsec tunnel B that carries data traffic for the new care-of address can be directly forwarded through the new AP with which the mobile device is going to associate.

In the illustrative embodiment shown in FIG. 7, at a point at which the mobile client device can only use a current subnet via an existing IPsec tunnel designated as IPsec tunnel (pCoA-pCoA⇔pAR), as shown at reference (1), higher layer pre-authorization and pre-configuration can be carried out (as discussed above). Then, as shown, an IPsec tunnel A can be established as represented by IPsec tunnel A (nCoA-pCoA⇔nAR). Here, this can involve, e.g., using IKE over IPsec tunnel SA (using nCoA as initiator's address). Then, an IPsec tunnel B can be established for redirected traffic for nCoA represented by IPsec tunnel B (nCoA—nCoAnAR). As shown, this could also be used for Mobile IP registration in some embodiments involving Mobile IP. At this point, the mobile client can use both the current and new subnets. Then, as shown at reference (3), the IPsec tunnel A is deleted and redirection is stopped. This can be done, e.g., using IKE. Then, the layer-2 handoff is completed. At this point, as shown at reference (3), the mobile client device can only use the new subnet. As shown at reference (4), the direct traffic for nCoA is carried out between the new AR and the mobile client using the IPsec tunnel B. This process can then be repeated at a later point in time to effect another handoff at another new access point.

Switching Back to the Previous Access Point

After a mobile client device completes a handoff to a target network, there may be some cases in which the client device needs to switch back to the previous network. In order to avoid re-establishing contexts for the previous network, the client device preferably stores or caches the previous contexts for a time period after completion of the new network connection. In some preferred embodiments, this switching back can be performed as follows:

If the mobile client device caches the contexts for the previous network to switch back, it does not need to perform pre-configuration of the contexts from scratch. For example, it can establish an IPsec tunnel to the previous AR, with specifying the cached IP address used for the previous network as the inner IP address rather than requesting a new IP address. Otherwise, it would perform pre-authentication and pre-configuration from scratch and perform virtual soft handoff as if it were initially connected.

Once the mobile client device in the current network has established the IPsec tunnel to the previous AR, the traffic is forwarded though the tunnel. The client device creates another IPsec tunnel to the previous AR with the previous IP address used as the outer IP address (i.e., if the device does not have it yet). The traffic will be put in the latter tunnel first, then the latter tunnel will be put in the former tunnel. When the client device is ready to perform a layer-2 handoff, it then deletes the former IPsec tunnel to stop redirection as described above.

Virtual Soft-Handoff for VPN Handoff

In some illustrative applications, the virtual soft-handoff technique can be applied to a VPN handoff in which the VPN tunnel endpoint IP address of the client device can change. However, when Mobile IP is running over VPN and the VPN tunnel endpoint IP address is the home address of the client device, there is no change in the endpoint IP address and, thus, this case can be excluded from VPN handoff. Two illustrative approaches to handle a VPN handoff are discussed below.

In a first illustrative approach, each VPN signaling protocol can be designed to allow VPN clients to update their endpoint IP address without establishing a new VPN for the new endpoint IP address from scratch. For example, IKEv2 allows re-use of Diffie-Hellman exponentials to reduce the signaling delay for updating the endpoint IP address of the VPN tunnel. For reference, the Diffie-Hellman key agreement protocol is a well known protocol that was developed by Diffie and Hellman in 1976 and allows two users to create and share a secret key over an insecure medium without any prior secrets.

In a second illustrative approach, another VPN tunnel can be established for the new endpoint IP address in the same way as it is done for the VPN tunnel for the old endpoint IP address. If the virtual soft-handoff mechanism is not used, this approach results in a significant communication interruption period since the establishment of the new VPN tunnel cannot be done until after the client device completes L2 handoff to the new network and once L2 handoff completes, the old VPN tunnel is not available anymore. In contrast, when a virtual soft-handoff is used, the client device can establish the new VPN tunnel and use it before it performs the L2 handoff to the new network while it can also use the old VPN tunnel at the same time. In terms of performance, this solution has notable advantages, such as, e.g., the advantage of minimizing the communication interruption during VPN handoff. In addition, the solution does not need to run Mobile IP outside the VPN tunnel. As a result, among other things, data packet encapsulation overhead can be reduced (i.e., during a period of virtual-soft handoff). In addition, the solution can advantageously avoid compromises in security.

Figure 8A:
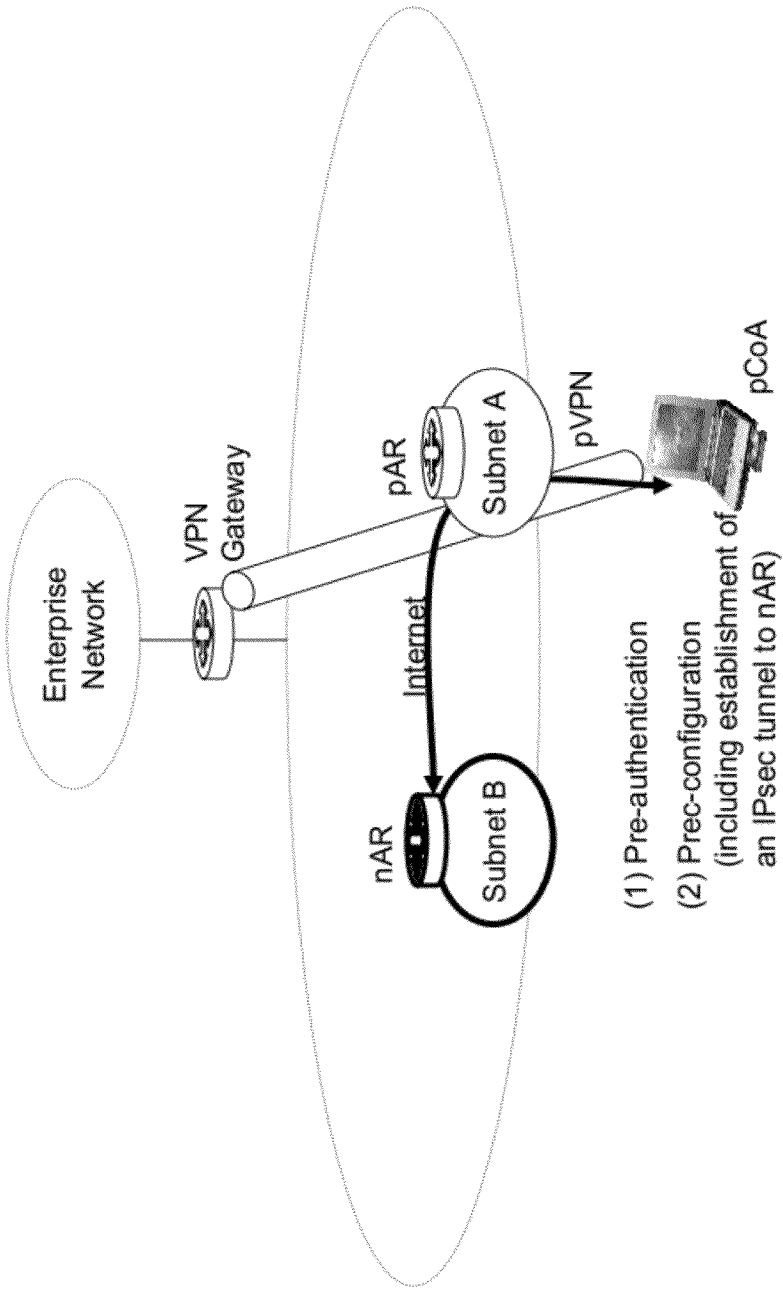
FIGS. 8(A) to 8(E) show an illustrative example demonstrating an exemplary sequence of a VPN handoff employing a virtual soft handoff.
Figure 8B:
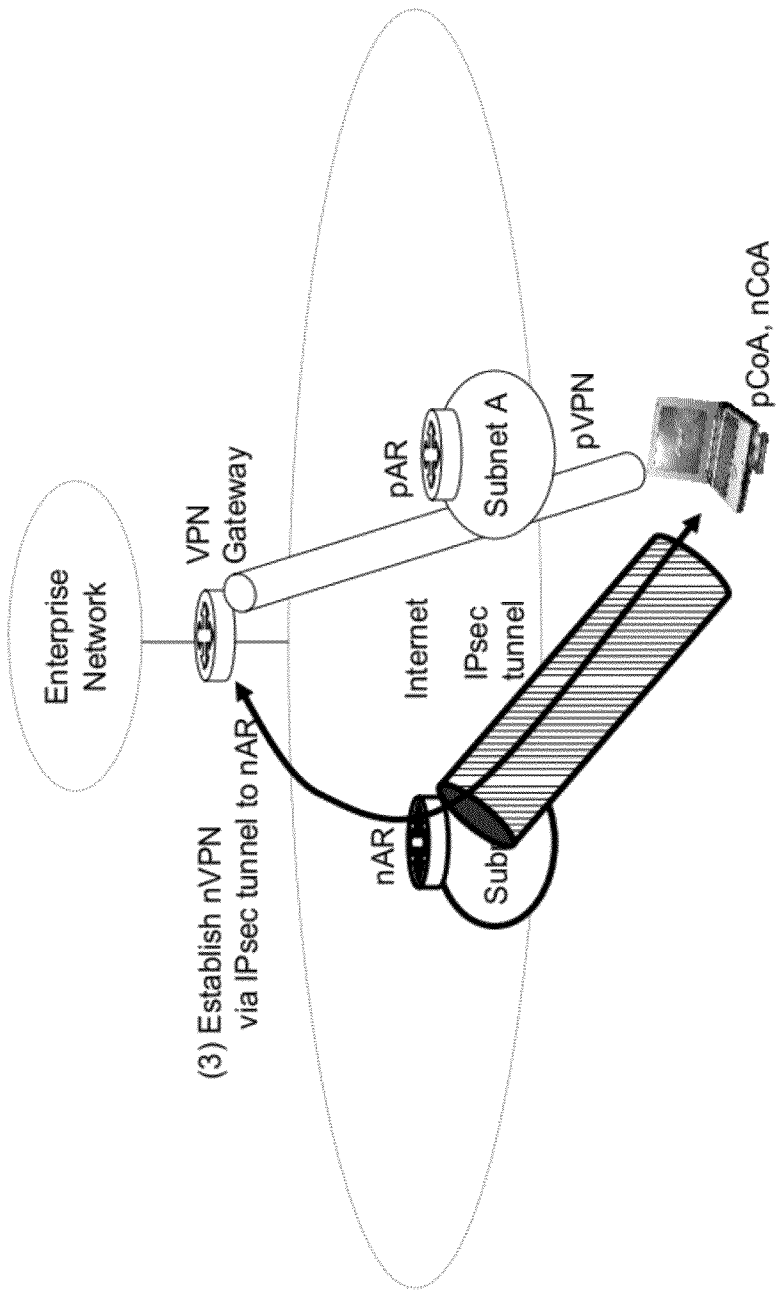
Figure 8C:
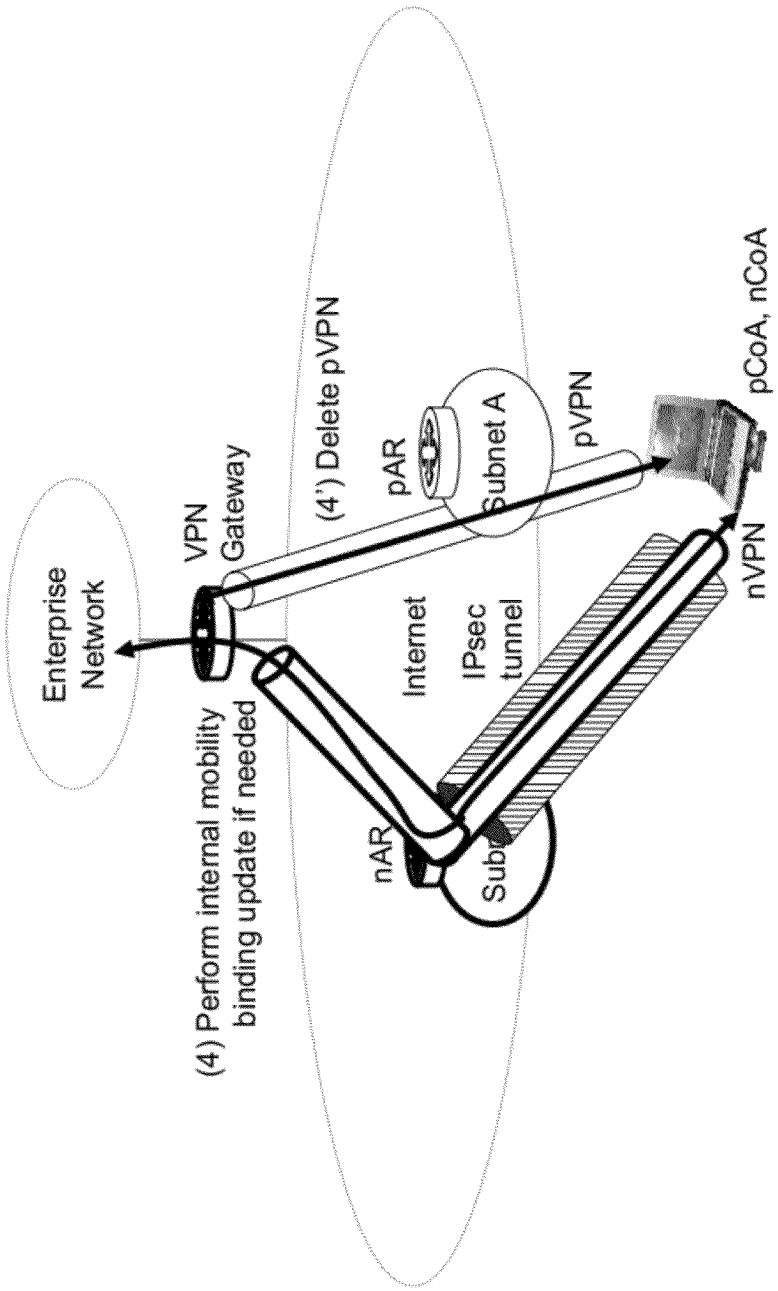
Figure 8D:
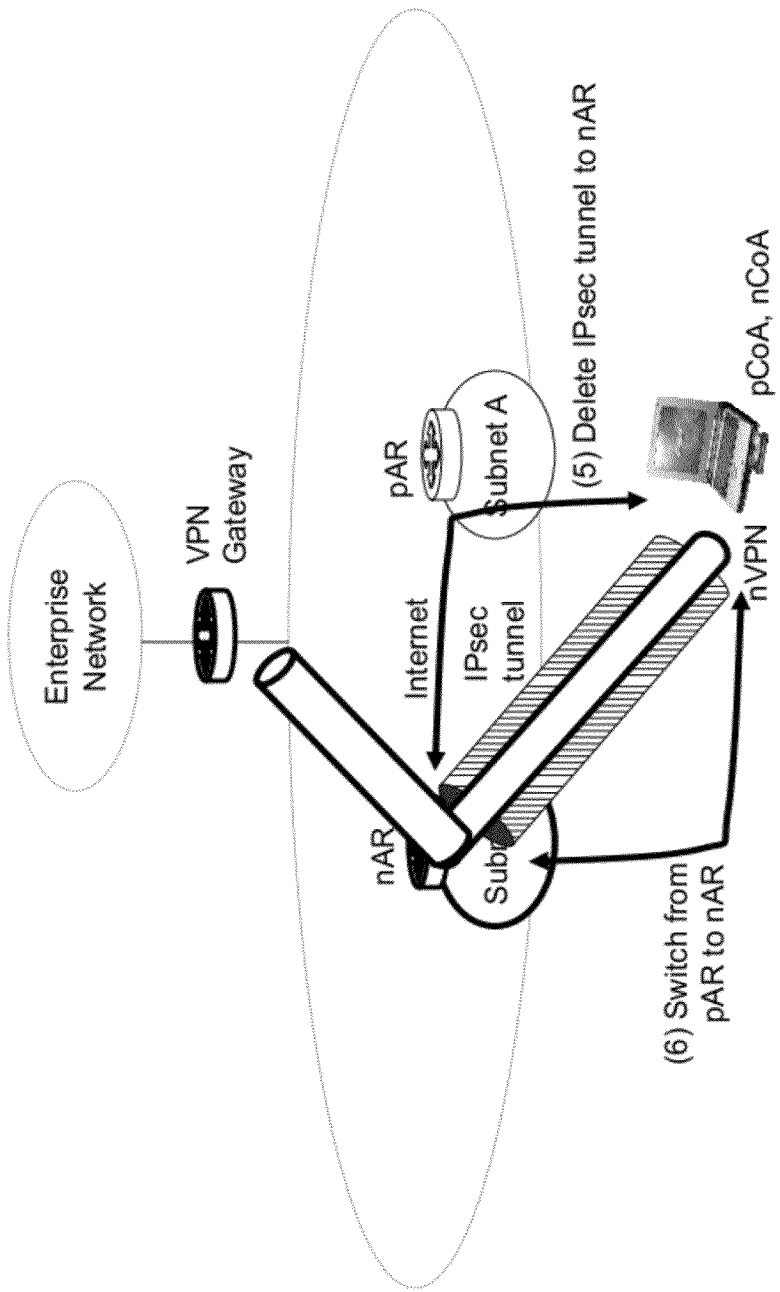
Figure 8E:
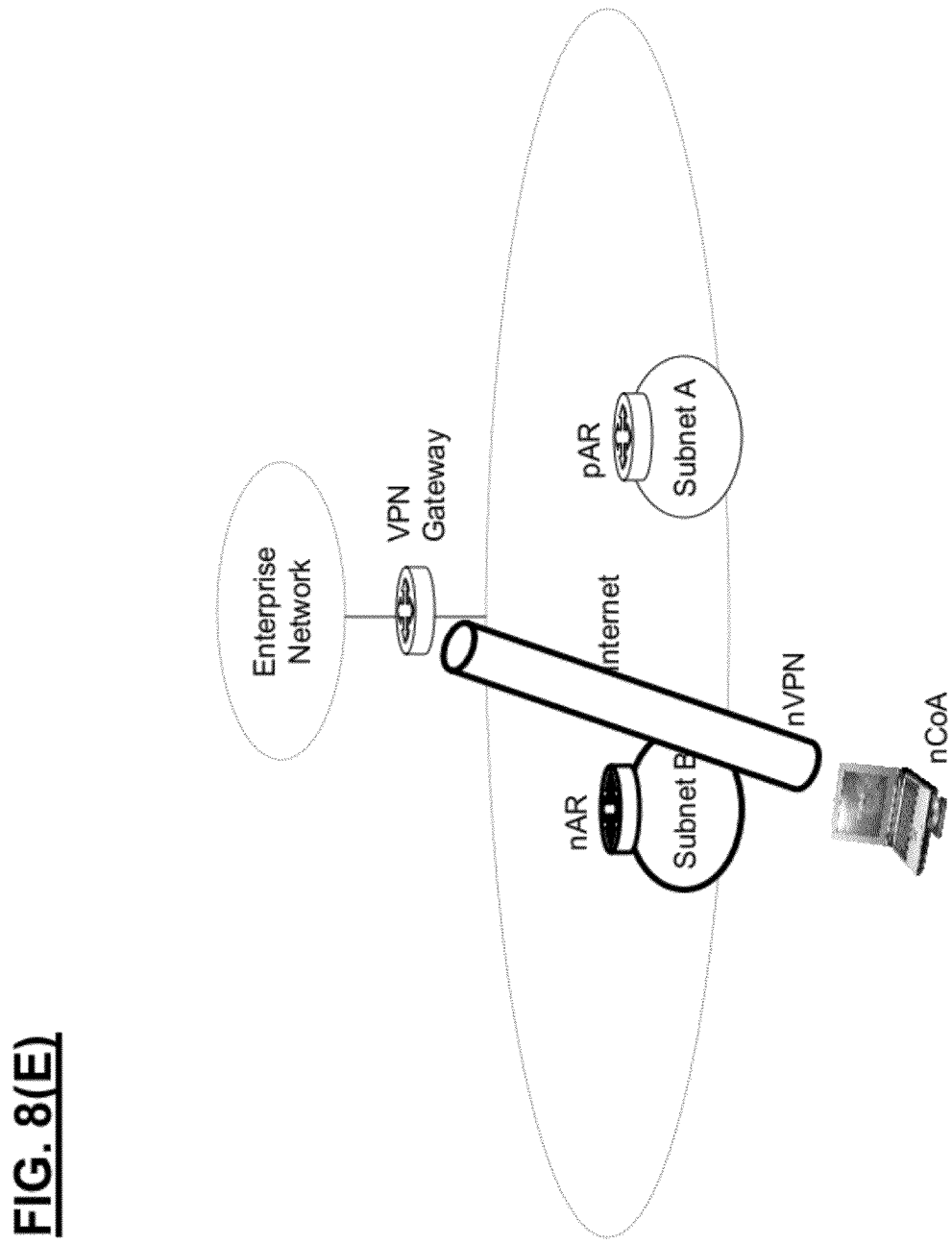

FIGS. 8(A) to 8(E) show an illustrative example of this second illustrative approach and demonstrate an exemplary sequence of a VPN handoff employing a virtual soft handoff. In this regard, FIG. 8(A) depicts first and second steps (shown at (1) and (2)) of pre-authentication and pre-configuration (including the establishment of an IPsec tunnel to nAR). FIG. 8(B) depicts a third step including (shown at (3)) the establishment of a new VPN (nVPN) tunnel via the IPsec tunnel to nAR. FIG. 8(C) depicts a fourth step (shown at (4), (4')) includes the deletion of the old VPN tunnel (which my include performing an internal mobility binding update if needed). FIG. 8(D) depicts fifth and sixth steps for switching to the new subnet, including, as shown at (5), deleting the IPsec tunnel to nAR and, as shown at (6), switching pAR to nAR. And, FIG. 8(E) depicts a final stage showing the completion of the VPN handoff.

Various Applications for the Preferred Embodiments

As should be appreciated based on the present disclosure, one or more aspect(s) of the preferred embodiments can be employed in a variety of environments and applications. For example, one or more aspect(s) can be employed in any type of wireless application handoff environment in which a mobile device can obtain a new network address (e.g., IP address or care-of address) and a new higher-layer contexts for a new network or subnetwork while the mobile device is in communication with (e.g., located within) a current network or subnetwork.

Figure 10A:
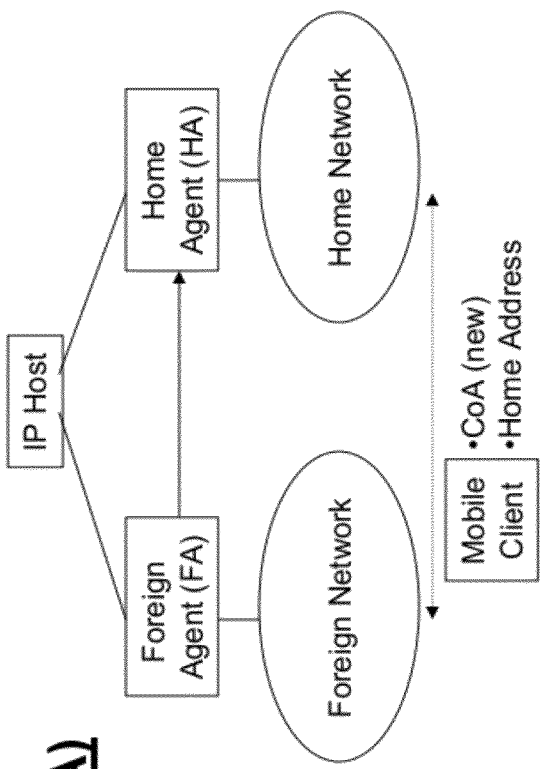
FIG. 10(A) shows an illustrative Mobile IP environment in which virtual soft handoff and/or other principles of the present invention can be employed when a mobile node moves from its home network to a foreign network and obtains a new CoA of the foreign network.
Figure 10B:
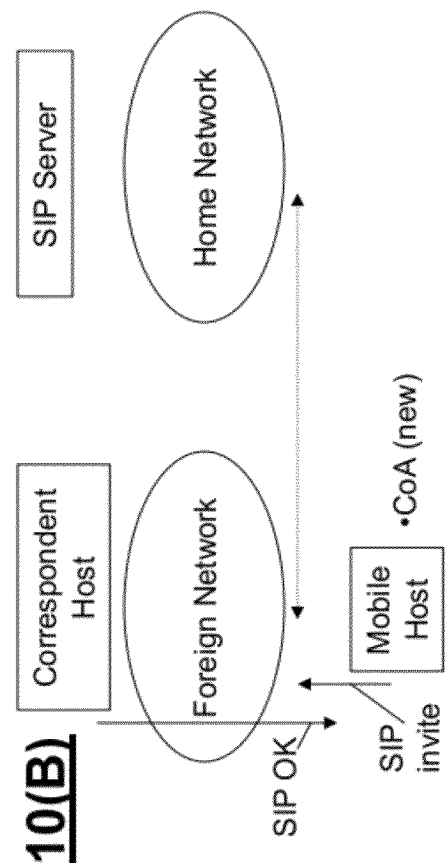
FIG. 10(B) shows an illustrative Session Initiating Protocol (SIP) Voice over IP (VoIP) environment in which virtual soft handoff and/or other principles of the present invention can be employed when a client moves to a foreign network and obtains a new CoA.

By way of example, a virtual soft handoff can be employed in any appropriate application, such as, e.g., a wireless Internet service provider (WISP) environment, a VPN environment, a Mobile IP environment, a Voice over IP (VoIP) environment, etc. For example, FIG. 10(A) shows an illustrative Mobile IP environment in which virtual soft handoff and/or other principles of the present invention can be employed when a mobile node moves from its home network to a foreign network and obtains a new CoA of the foreign network. As another example, FIG. 10(B) shows an illustrative Session Initiating Protocol (SIP) Voice over IP (VoIP) environment in which virtual soft handoff and/or other principles of the present invention can be employed when a client moves to a foreign network and obtains a new CoA. In this manner, among other things, delay associated with such handoffs can be minimized. See, e.g., Wireless IP and the Mobile Internet, S. Dixit and R. Prasad, Artech House Publishers, 2003 at p. 362 ("Delay associated with [SIP] handoff would consist of several factors such as delay due to . . . IP address acquisition by the mobile"), the entire disclosure of which is incorporated herein by reference.

Broad Scope of the Invention

While illustrative embodiments of the invention have been described herein, the present invention is not limited to the various preferred embodiments described herein, but includes any and all embodiments having equivalent elements, modifications, omissions, combinations (e.g., of aspects across various embodiments), adaptations and/or alterations as would be appreciated by those in the art based on the present disclosure. The limitations in the claims are to be interpreted broadly based on the language employed in the claims and not limited to examples described in the present specification or during the prosecution of the application, which examples are to be construed as non-exclusive. For example, in the present disclosure, the term "preferably" is non-exclusive and means "preferably, but not limited to." In this disclosure and during the prosecution of this application, means-plus-function or step-plus-function limitations will only be employed where for a specific claim limitation all of the following conditions are present in that limitation: a) "means for" or "step for" is expressly recited; b) a corresponding function is expressly recited; and c) structure, material or acts that support that structure are not recited. In this disclosure and during the prosecution of this application, the terminology "present invention" or "invention" may be used as a reference to one or more aspect within the present disclosure. The language present invention or invention should not be improperly interpreted as an identification of criticality, should not be improperly interpreted as applying across all aspects or embodiments (i.e., it should be understood that the present invention has a number of aspects and embodiments), and should not be improperly interpreted as limiting the scope of the application or claims. In this disclosure and during the prosecution of this application, the terminology "embodiment" can be used to describe any aspect, feature, process or step, any combination thereof, and/or any portion thereof, etc. In some examples, various embodiments may include overlapping features. In this disclosure, the following abbreviated terminology may be employed: "e.g." which means "for example;" and "NB" which means "note well."

What is claimed is:

1. A method, comprising:
resolving an IP address of an access point in a new subnetwork when a mobile station is in a current subnetwork; and
obtaining pre-authentication for the mobile station to work over the current and new subnetworks using said IP address, said obtaining pre-authentication including said mobile station communicating with said access point in said new subnetwork when said mobile station is in said current subnetwork through an access point in said current subnetwork prior to handover.

2. The method of claim 1, wherein said resolving includes a dynamic resolution of the IP address.

3. The method of claim 1, wherein said resolving includes having an access point beacon or probe response include an IP address.

4. The method of claim 1, wherein said resolving includes using a CARD mechanism for dynamic resolution.

5. The method of claim 1, wherein said resolving includes a static resolution of the IP address.

6. The method of claim 5, wherein said static resolution includes using DHCP for carrying a list of pairs of the MAC addresses and IP addresses for at least one nearby access point (AP).

7. The method of claim 5, wherein said static resolution includes using EAP-TLV for carrying a list of pairs of the MAC addresses and IP addresses for at least one nearby access point.

8. A method, comprising:
resolving an IP address of an access point in a new subnetwork when a mobile station is in a current subnetwork; and
obtaining pre-authentication for the mobile station to work over the current and new subnetworks using said IP address;
wherein said access point in the new subnetwork supports higher-layer pre-authentication and communicates with the mobile station.

9. The method of claim 8, wherein the said access point in the new subnetwork communicates with the mobile remote station prior to handover by using a higher-layer protocol that carries 802.1X frames.

10. The method of claim 9, further including carrying 802.1X frames and maintaining order invariance of EAP messages prior to handover.

11. The method of claim 9, further including using PANA for carrying EAP messages prior to handover.

12. The method of claim 9, further including using IKEv2 for carrying EAP messages prior to handover.

13. The method of claim 1, further including prior to handover having said mobile station transmit a pre-authentication start request to an access point in the new subnetwork through an access point in the current subnetwork.

14. The method of claim 1, further including having said mobile station receive a beacon frame from said access point in said new subnetwork and then transmit said pre-authentication start request upon its wishing to pre-authenticate with said access point in said new subnetwork.

15. The method of claim 1, further including after completion of handover to said new subnetwork, to avoid re-establishing of contexts for the current subnetwork, having said mobile station cashe contexts for said current subnetwork for a period of time after completion of connection to said new subnetwork.

16. The method of claim 14, further including prior to switching back to said current subnetwork, having said mobile establish an IP sec tunnel to said access point in said current subnetwork with specifying said cashed IP address rather than using a new IP address.

* * * * *